United States Patent [19]

Wasserman et al.

[11] Patent Number: 5,812,791

[45] Date of Patent: Sep. 22, 1998

[54] MULTIPLE SEQUENCE MPEG DECODER

[75] Inventors: Steve C. Wasserman, Cupertino; James Armand Baldwin; George Mitsuoka, both of Mountain View, all of Calif.

[73] Assignee: CagEnt Technologies, Inc., Santa Clara, Calif.

[21] Appl. No.: 769,346

[22] Filed: Dec. 19, 1996

Related U.S. Application Data

[63] Continuation of Ser. No. 440,464, May 10, 1995, abandoned.

[51] Int. Cl.$^6$ ..................................... H04N 1/41
[52] U.S. Cl. .................... 395/200.77; 348/403; 348/416; 348/420; 348/426
[58] Field of Search .................. 395/200.77; 348/403, 348/416, 420, 426; 382/166, 232, 236, 246, 250

[56] References Cited

U.S. PATENT DOCUMENTS

| | | | |
|---|---|---|---|
| 5,227,878 | 7/1993 | Puri et al. | 348/136 |
| 5,262,854 | 11/1993 | Ng | 358/133 |
| 5,379,070 | 1/1995 | Retter et al. | 348/403 |
| 5,379,351 | 1/1995 | Fandrianto et al. | 382/41 |
| 5,379,356 | 1/1995 | Purcell et al. | 382/56 |
| 5,461,679 | 10/1995 | Normile et al. | 382/304 |
| 5,502,494 | 3/1996 | Auld | 348/426 |
| 5,508,942 | 4/1996 | Agrawal | 364/514 R |
| 5,510,841 | 4/1996 | Iwamua | 348/420 |
| 5,510,842 | 4/1996 | Phillips et al. | 348/426 |
| 5,511,003 | 4/1996 | Agarwal | 364/514 R |
| 5,512,952 | 4/1996 | Iwamura | 348/416 |
| 5,598,514 | 1/1997 | Purcell et al. | 395/118 |
| 5,604,540 | 2/1997 | Howe | 348/405 |

OTHER PUBLICATIONS

C–Cube Microsystems Product Catalog, pp. 9–36, 91–112, Fall 1994.

Information Technology—Coding of moving pictures and associated audio for digital storage media at up to about 1,5 Mbit/s—Part 2: Video, First Edition 1993–08–01, ISO/IEC Joint Technical Committee, No. 11172–2.

*Primary Examiner*—Emanuel Todd Voeltz
*Assistant Examiner*—Patrick Assovad
*Attorney, Agent, or Firm*—Fenwick & West LLP

[57] ABSTRACT

An MPEG decoding system in a host system, including software instructions for decoding a first portion of MPEG encoded data, including instructions for extracting macroblock data from said MPEG encoded data and for establishing a decoding order for said macroblock data. The system further includes hardware for extracting motion vector data and display data from said macroblocks. An entropy decoder for decoding encoded AC coefficients and DC coefficients in said display data is provided. An inverse quantization unit inversely quantizing said coefficients into a resulting array of decoded AC coefficients is also provided. An de-zig-zag unit scans said array of decoded AC coefficients and DC coefficients in a zig-zag pattern to provide a block of discrete cosine transformed coefficients. A inverse discrete cosine transform unit takes the inverse discrete cosine transform of the block of discrete cosine transformed coefficients to provide a first set of pel data. A motion vector processor decodes the motion vector data to provide a second set of pel data, and a motion compensation unit adds the first and second sets of pel data.

36 Claims, 17 Drawing Sheets

Byte Offsets

| Block | Offset |
|---|---|
| Y0(T) | 0 |
| Y0(B) | 32 |
| Y1(T) | 64 |
| Y1(B) | 96 |
| Y2(T) | 128 |
| Y2(B) | 160 |
| Y3(T) | 192 |
| Y3(B) | 224 |
| Cb4(0) | 256 |
| Cb4(1) | 272 |
| Cb4(2) | 288 |
| Cb4(3) | 304 |
| Cr5(0) | 320 |
| Cr5(1) | 336 |
| Cr5(2) | 352 |
| Cr5(3) | 368 |

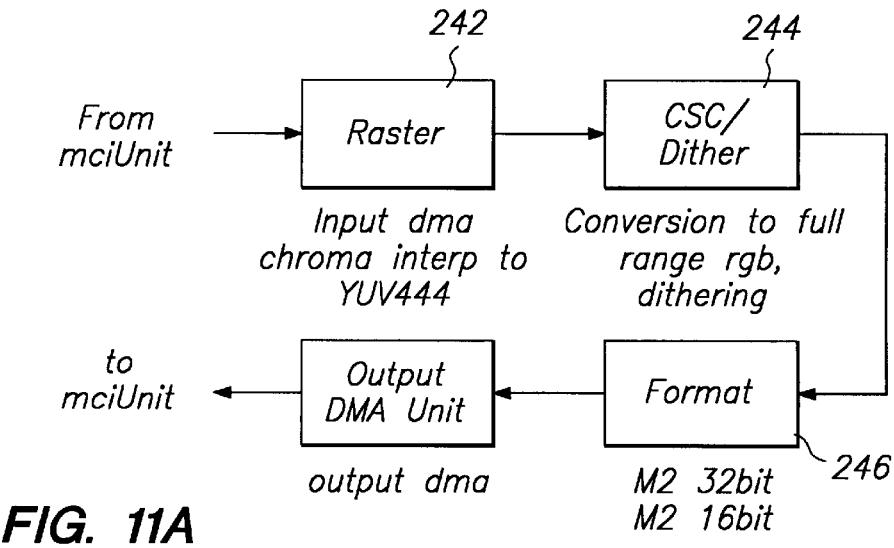
FIG. 11A
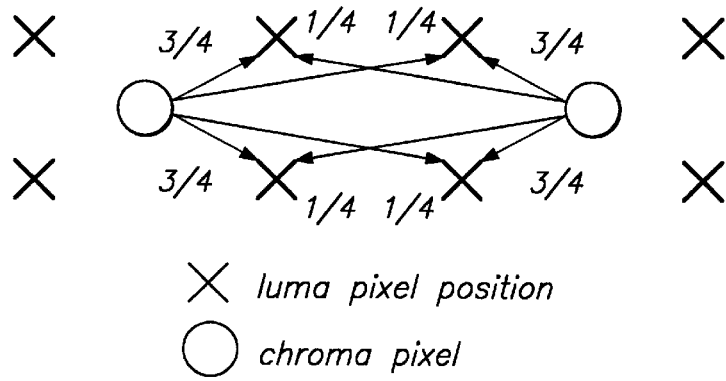
× luma pixel position
○ chroma pixel
FIG. 11B
Input: Y (luminance), Cb (blue chrominance),
Cr (red chrominance)
Output: R (red), G (blue), B (blue)
↓
(normalize YCbCr components)
y = Y − 16
u = Cb − 128
v = Cr − 128         — 480
↓
(compute RGB components)
R = (292*y + 399*v) / 256
G = (292*y − 97*u − 204*v) / 256
B = (292*y + 506*u) / 256         — 482
FIG. 11C

Bitstream Requirements

| Frame Type | I | P | B | B | P | B | B | I | B | B |
|---|---|---|---|---|---|---|---|---|---|---|
| Sequence # | 1 | 4 | 2 | 3 | 7 | 5 | 6 | 10 | 8 | 9 |
| MPEG out | R0 | R1 | CSC | CSC | R0 | CSC | CSC | R1 | CSC | CSC |
| CSC in | MPEG | R0 | MPEG | MPEG | R1 | MPEG | MPEG | R0 | MPEG | MPEG |
| CSC out | D0 | D1 | D0 | D1 | D0 | D1 | D0 | D1 | D0 | D1 |
| [Reference 0] | x | 1 | 1 | 1 | 1 | 7 | 7 | 7 | 7 | 7 |
| [Reference 1] | x | x | 4 | 4 | 4 | 4 | 4 | 4 | – | – |
| [Display 0] | x | 1 | 1 | 2 | 2 | 4 | 4 | 6 | 6 | 8 |
| [Display 1] | x | x | 1 | 1 | 3 | 3 | 5 | 5 | 7 | 9 |
| Display | x | x | D1 | D0 | D1 | D0 | D1 | D0 | D1 | D0 |
| [Display] | x | x | 1 | 2 | 3 | 4 | 5 | 6 | 7 | 8 |

| | | |
|---|---|---|
| | – | |
| | – | |
| | – | |
| | – | |
| | – | |
| | – | |
| | 8 | |
| | 9 | |
| | D1 | |
| | 9 | |

*FIG. 15*

MULTIPLE SEQUENCE MPEG DECODER

This application is a file wrapper continuation of Ser. No. 08/440,464, filed May 10, 1995, now abandoned.

CROSS-REFERENCE TO RELATED APPLICATIONS

U.S. patent application Ser. No. 08/438,860, entitled CONFIGURABLE VIDEO DISPLAY SYSTEM HAVING LIST-BASED CONTROL MECHANISM FOR TIME-DEFERRED INSTRUCTING OF 3D RENDERING ENGINE THAT ALSO RESPONDS TO SUPERVISORY IMMEDIATE COMMANDS, inventors: Adrian Sfarti, Nicholas Baker, Robert Laker, and Adam Malamy, filed May 10, 1995.

U.S. patent application Ser. No. 08/781,452 entitled CONFIGURABLE VIDEO DISPLAY SYSTEM HAVING LIST-BASED CONTROL MECHANISM FOR BY-THE-LINE AND BY-THE-PIXEL MODIFICATION OF DISPLAYED FRAMES AND METHOD OF OPERATING SAME, inventors Richard W. Thaik, Robert Joseph Mical, Stephen Harland Landrum, and Steve C. Wasserman filed May 10, 1995, which is a continuation of U.S. patent application Ser. No. 08/439,085, filed May 10, 1995, now abandoned.

PCT Patent Application Ser. No. PCT/US92/09342, entitled RESOLUTION ENHANCEMENT FOR VIDEO DISPLAY USING MULTI-LINE INTERPOLATION, by inventors Mical et al., filed Nov. 2, 1992, and also to U.S. patent application Ser. No. 07/970,287, bearing the same title, same inventors and also filed Nov. 2, 1992;

PCT Patent Application Ser. No. PCT/US92/09349, entitled AUDIO/VIDEO COMPUTER ARCHITECTURE, by inventors Mical et al., filed Nov. 2, 1992, and also to U.S. patent application Ser. No. 07/970,308, bearing the same title, same inventors and also filed Nov. 2, 1992;

PCT Patent Application Ser. No. PCT/US92/09350, entitled METHOD FOR CONTROLLING A SPRYTE RENDERING PROCESSOR, by inventors Mical et al., filed Nov. 2, 1992, and also to U.S. patent application Ser. No. 07/970,278, bearing the same title, same inventors and also filed Nov. 2, 1992;

PCT patent Application Ser. No. PCT/US92/09462, entitled SPRYTE RENDERING SYSTEM WITH IMPROVED CORNER CALCULATING ENGINE AND IMPROVED POLYGON-PAINT ENGINE, by inventors Needle et al., filed Nov. 2, 1992, and also to U.S. patent application Ser. No. 07/970,289, bearing the same title, same inventors and also filed Nov. 2, 1992;

PCT Patent Application Ser. No. PCT/US92/09460, entitled METHOD AND APPARATUS FOR UPDATING A CLUT DURING HORIZONTAL BLANKING, by inventors Mical et al., filed Nov. 2, 1992, and also to U.S. patent application Ser. No. 07/969,994, bearing the same title, same inventors and also filed Nov. 2, 1992;

PCT Patent Application Ser. No. PCT/US92/09467, entitled IMPROVED METHOD AND APPARATUS FOR PROCESSING IMAGE DATA, by inventors Mical et al., filed Nov. 2, 1992, and also to U.S. patent application Ser. No. 07/970,083, bearing the same title, same inventors and also filed Nov. 2, 1992;

PCT Patent Application Ser. No. PCT/US94/12521, entitled DISPLAY LIST MANAGEMENT MECHANISM FOR REALTIME CONTROL OF BY-THE-LINE MODIFIABLE VIDEO DISPLAY SYSTEM, by inventors Robert Joseph Mical et al., filed Nov. 1, 1994, and also to U.S. patent application Ser. No. 08/146,505, bearing the same title, same inventors and filed Nov. 1, 1993; and U.S. patent application Ser. No. 08/311,192 entitled REAL TIME DECOMPRESSION AND POST-DECOMPRESS MANIPULATION OF COMPRESSED FULL MOTION VIDEO, by inventors Steve C. Wasserman et al., filed Sep. 23, 1994.

The related patent applications are all commonly assigned with the present application and are all incorporated herein by reference in their entirety.

BACKGROUND OF THE INVENTION

1. Field of the Invention

The invention relates to a system for extracting and decoding motion image data encoded in accordance with the ISO/IEC International Standard 11172-2.

2. Description of the Related Art

To address the growing need for a common format of representing compressed video on various digital storage media, the ISO/IEC standard 11172-2 has been adopted as one standard for compression of such image data. The standard is more commonly referred to as the Moving Picture Expert's Group (MPEG) standard or "MPEG-1". A second standard, ISO/IEC standard 13818, is a more robust version of video decoding and is more commonly known as MPEG-2. MPEG-1 is a subset of MPEG-2. Both standards have several basic compression algorithms in common, including motion compensation, application of the discrete cosine transform (DCT), quantization, variable length coding and run-length encoding.

In an MPEG-1 system, data is provided in a stream that is generally made up of two layers: a system layer contains timing and other information needed to multiplex audio and video and user data streams and to synchronize audio and video during playback; and a compression layer includes the user data, compressed audio and video streams. A system de-multiplexer extracts the timing information from the MPEG stream and sends it to other system components. The system de-multiplexer also de-multiplexes the video and audio streams and sends each to an appropriate decoder.

A video decoder in accordance with the MPEG standard will decompress the video stream. Each video stream is arranged in a data hierarchy with each lower level of the hierarchy comprising a component of a higher level of the hierarchy. The video stream data hierarchy comprises: the video sequence; the group of pictures; a picture; a slice; a macroblock; and a block. This hierarchy is represented graphically in FIG. 1A. The video sequence is the highest level of the video bitstream. The video sequence always consists of a sequence header, one or more groups of pictures, and an end of sequence code. The video sequence is another term for the video stream. The sequence may contain any number of instances of the "group of pictures" layer, as well as information such as picture size, aspect ratio, frame rate, bit rate, input buffer size, quantization tables, a "constrained parameters" flag, information about buffer sizes, and optional user data.

The group of pictures layer consists of one or more pictures intended to allow random access into a sequence. The group of pictures encompasses a series of pictures that are to be displayed contiguously. The group of pictures may possibly depend on reference frames from a previous group of pictures. A so-called "closed" group of pictures has no such pictures while an "open" group of pictures contains references to a previous group of pictures. A group of pictures will begin with a header that contains a time code and optional user data, followed by any number of pictures.

The picture is the primary coding unit of a video sequence. The picture generally consists of three rectangular matrices representing luminance (Y) and two chrominance (CbCr) values. The Y matrix has an even number of rows and columns. The Cb and Cr matrices are one-half the size of the Y matrix in each direction (horizontal and vertical). Thus, for every four Y samples, there is one Cr sample and one Cb sample. The most commonly used size for movie encoding are 352×240 pixels at 29.97 or 24 frames per second (NTSC) and 352×288 at 25 frames per second (PAL).

The picture contains decoded information for one frame of video. Each picture may be one of four possible types. An "intra" picture or "I-picture" is coded using only information present in the picture itself. "I" pictures provide random access points into the compressed video data. "I" pictures use only quantization, run length and VLC coding and therefore provide moderate compression. A predicted or "P-picture" is coded with respect to the previous I- or P-picture. This technique is called forward prediction. Predicted pictures provide more compression and serve as a reference for B-pictures (described below) and future P-pictures. (I-pictures may also serve as a reference for B-pictures.) P-pictures use motion compensation to provide more compression than is possible with I-pictures. "Bidirectional" or B-pictures are pictures that use both a past and future picture as a reference. Bidirectional pictures provide the most compression, and do not propagate errors because they are never used as a reference. The final type of picture is a "DC-coded" picture or "D-picture", which is coded using only information from itself and intended for use in fast-forward searching.

Below the picture layer of the video bitstream is the slice layer. The slice layer contains series of 16-pixel×16 line sections of luminance (Y) components and the corresponding 8-pixel by 8 line sections of the chrominance (CrCb) components. A macroblock thus contains four Y-blocks, one Cb block and one Cr block, as noted above.

Each data block is an 8×8 set of values of a luminance or chrominance component. As discussed below, a data block may also be comprised of motion vectors and error terms.

In general, MPEG compression of image data involves a translation of pixel data from the red/green/blue (RGB) colorspace to the Y-CbCr color space, an application of the discrete cosine transform (DCT) to remove data redundancy, quantization of the DCT coefficients using weighting functions optimized for the human visual system, and encoding the quantized AC coefficient by first using zero run-length coding, followed by compression using entropy encoding, such as Huffman coding.

The combination of DCT and quantization results in many of the frequency coefficients being zero, especially the coefficients for high spatial frequencies. To take maximum advantage of this, the coefficients are organized in a zig-zag order to produce long runs of zeroes. This is represented in FIG. 1B. The coefficients are then converted to a series of run amplitude pairs, each pair indicating a number of zero coefficients and the amplitude of a non-zero coefficient.

Some blocks of pixels need to be coded more accurately than others. For example, blocks with smooth intensity gradients need accurate coding to avoid visible block boundaries. The MPEG algorithm allows the amount of quantization to be modified for each 16×16 block of pixels, and this mechanism can also be used to provide smooth adaptation to a particular bit rate. The MPEG video bitstream includes the capacity for carrying quantization tables, to allow for modification of the degree of quantization.

In addition, motion compensation is a technique used for enhancing the compression of P- and B-pictures by eliminating temporal redundancy. Motion compensation typically improves compression by a factor of 2–5 compared to intra-picture coding. Motion compensation algorithms work at the macroblock level. When a macroblock is compressed by motion compensation, the compressed file contains: motion vectors—the spatial difference between the reference picture(s) and the macroblock being coded; and error terms—content differences between the reference and the macroblock being coded. When a macroblock in a P- or B-picture cannot be well predicted by motion compensation, it is coded in the same way a macroblock in an I-picture is coded, by using transform coding techniques using no prediction value. Macroblocks in a B-picture can be coded using either a previous or future reference picture as a reference so that four codings are possible.

A timing mechanism ensures synchronization between audio and video. in the MPEG-1 standard, a system clock reference and a presentation time stamp are utilized by the decoder. Additional standards are added by the MPEG-2 standard. System clock references and presentation time stamps in MPEG-1 are 33 bit values, which can represent any clock cycle in a 24-hour period.

A system clock reference (SCR) is a reflection of the encoder system clock. SCRs used by an audio and a video decoder must have approximately the same value. SCRs are inserted into the MPEG stream at least as often 0.7 seconds by the MPEG encoder, and are extracted by the system decoder and sent to the audio and video decoders, which update their internal clocks using the SCR value by the system decoder.

Presentation time stamps are samples of the encoder system clock that are associated with some video or audio presentation units. The presentation unit is a decoded video picture or a decoded audio time sequence. The encoder inserts presentation time stamps into the MPEG stream at least as often as every 0.7 seconds. The PTS represents the time at which the video picture is to be displayed or the starting playback time for the audio sequence.

Model MPEG decoders are set forth in the ISO/IEC 1172-2 standard. In appendix D thereof, the general decoder model includes an input buffer and a picture decoder. The input buffer stores data at a fixed rate and at regular intervals, set by the picture rate, the picture decoder instantaneously removes all the bits from the next picture from the input buffer.

In general, decoding a video sequence for forward playback involves first decoding the sequence header including the sequence parameters. These parameters will include the horizontal and vertical resolutions and aspect ratio, the bit rate, and the quantization tables or matrices. Next the decoder will decode the group of pictures' header, including the "closed GOP and broken LINK information," and take appropriate action. It will decode the first picture header in the group of pictures and read the VBV_delay_field. If playback begins from a random point in the bitstream, the decoder should discard all the bits until it finds a sequence start code, a group of pictures start code, or a picture start code which introduces an I-picture. The slices and macroblocks in the picture are decoded and written into a display buffer, and perhaps into another buffer. The decoded pictures may be post-processed and displayed in the order defined by the temporal reference at the picture rate defined in the sequence header.

The decoding sequence of pictures may not be the same as the display sequence. Thus, some mechanism of ordering the display sequence, and storing decoded image data, is required.

MPEG decoders can be implemented in a series of hardware and software configurations. For example, in an IBM PC-type computer, the system's CPU, internal data bus, and data storage unit can be programmed to perform all buffering and decoding functions. Software decoders capable of performing stream decoding include Xingit! from Xing Technology Corp., Arroyo Grande, Calif. Hardware processors such as the COM4100 family of multimedia processors available from C-Cube Microsystems provide hardware/software implemented processing of MPEG-encoded data. In addition, the C-Cube CL550 and CL560 JPEG (Joint Photographic Expert's Group) processors, which perform the JPEG baseline sequential process (a process which is essentially incorporated into the MPEG compression algorithm), include capabilities to allow for user-defined Huffman tables and quantization tables to be programmed into hardware component blocks which perform Huffman coding and decoding and quantization on 8×8 blocks of JPEG picture data.

In general, MPEG decoding streams consist of around 9,900 macroblocks per second (plus audio). In many multimedia applications, it would be beneficial to provide decoding potential in excess of the 9,900 macroblock per second rate to allow interactive applications, which will require different MPEG streams to be decoded simultaneously (or in a "multi-threaded" capacity), to be implemented. For example, in multimedia applications where different portions of the display screen will need to be reacting to actions of the user, and such applications are based on the video data which is stored in an MPEG format, multi-threaded decoding capability would be essential.

SUMMARY OF THE INVENTION

It is therefore an object of the present invention to provide an MPEG decoding system which utilizes system resources from a host system in conjunction with those of a decoding processor to effectively process MPEG decoding streams.

It is a further object of the invention to provide a decoding system yielding a high band width using minimal host system and processing hardware resources.

It is another object of the invention to provide a low-cost decoding system.

It is a further object of the invention to provide a high-performance decoder for standard MPEG-1 source material in a single threaded decoding sequence.

It is another object of the invention to provide a multiply-threaded MPEG decoding stream, being capable of simultaneously decoding several MPEG streams.

A further object of the invention is to provide an MPEG-decoding system which shares resources with the host system, including the host system main memory and the central processing unit.

Yet another object of the invention is to incorporate an MPEG decoder as part of a multimedia application specific integrated circuit.

These and other objects of the invention are incorporated in an MPEG hardware/software decoding system, having a unique hardware/software split of the functions necessary to decode the MPEG video coding hierarchy. In accordance with the object of the invention, the software portion of the decoding system decodes all layers of the MPEG stream above the "slice layer", while the hardware unit decodes all layers of the video coding hierarchy below the slice layer and including the slice layer. In this manner, decompression of the MPEG video stream is divided between the host system's central processing unit and specialized MPEG decoding hardware. The result is a very flexible system which may be tasked with decompressing varied image sizes, multiple threads and moving video, and still images for use in, for example, a multimedia application. For example, the still images may be utilized as textures or backgrounds, with overlays of moving video on the still images. A good example of this would be provision of a baseball field, wherein nine players are represented in addition to a hitter. The MPEG decoding system of the present invention can decode the still image which is utilized for the backdrop of the playing field, the video image necessary to allow the picture to simulate and represent throwing the ball towards the hitter, a separate decoding thread for the actions of the hitter, and multiple decoding threads for actions of players in the field in reaction to a ball being hit by the batter as a result of the pitch.

In addition, the invention allows for linear playback of the standard MPEG video stream.

In a first aspect of the invention, a configurable decoding system for an MPEG video stream is provided. The system may be located in a host system, with the host system including host system memory, a host system memory controller, and a central processing unit. The host system memory will store MPEG-encoded data including a video sequence comprising one or more groups of pictures. The decoding system of the present invention will include instructions, provided in the system memory and operable by the central processing unit of the host system, to configure the system memory to include buffers such as a reference buffer, display buffer and strip buffer. Further instructions will be included for extracting MPEG-encoded data image from stored image data in the host system memory. The MPEG-encoded data will include information necessary for extracting pictures from the MPEG data stream. Configurable MPEG decoding hardware is also provided. The configurable MPEG decoding hardware includes a configurable parser which extracts image data and motion vectors from the data stream, an entropy decoding unit to perform, for example, run-length decoding, an inverse quantization means for extracting the quantization coefficients of the data, an inverse zig-zag unit to remove the matrices data, and an inverse discrete cosine transform unit to return the chrominance and luminance pixel values. The instruction set includes means to configure the configurable MPEG decoder hardware with the information necessary to extract the MPEG data. Also provided is a motion compensation unit which, in conjunction with a motion vector processor, couples the pixel values output from the inverse discrete cosine transform unit and the motion vector data. An output display unit is provided which includes a video output DMA controller and video output formatter, both of which are coupled to the host system memory and interact with the host system memory display buffers, to display the image data to a display output.

In another aspect of the invention, an integrated circuit in a host system is provided. The host computer system will include a processor, system memory, system bus, and a system memory controller. The integrated circuit will include an input-output bus and a memory controller interface coupled to the system memory controller via the system bus. A video data DMA controller, coupled to the system memory interface via the input-output bus, is also provided. A parser for distributing motion vector data and image data is coupled to the video data DMA controller. An entropy (RLL) decoding means, coupled to the parser, and receiving distributed macroblocks to allow decoding of the macroblocks into quantized coefficient blocks, is also provided. An inverse quantizer for receiving the quantized coefficient blocks and performing an inverse quantization on said quantized coefficient blocks to form pixel value blocks is coupled to the Huffman decoding means. An inverse zig-zag unit is coupled to the inverse quantization means and converts the blocks from a block format to a data stream format. An inverse discrete cosine transform unit is coupled to the inverse zig-zag means and calculates the inverse discrete cosine transform of the pixel coefficients. A motion vector processor is coupled to the parser and receives distributed motion vectors and pixel data. A motion compensation unit, coupled to the motion vector analyzer and the inverse discrete cosine transform means, adds the motion vectors and pixel values. Finally, a video output DMA controller, coupled to the motion compensation unit and the I/O bus, controls output data written to the host system memory for reformatting by the output formatter.

BRIEF DESCRIPTION OF THE DRAWINGS

The invention will be described with respect to the particular embodiments thereof. Other objects, features, and advantages of the invention will become apparent with reference to the specification and drawings in which:

FIG. 11A is a block diagram of the video output display functions in accordance with the system of the present invention.

FIG. 11B is a representation of the raster conversion of chroma data to YUV444 format.

FIG. 11C is a flowchart of the colorspace conversion matrix utilized in the CSC/dither circuit.

FIG. 15 is a table showing the inputs and outputs of each block of data during a typical video sequence.

DESCRIPTION OF THE PREFERRED EMBODIMENTS

The invention provides a flexible MPEG decoding system which is implemented in both hardware and software. A key aspect of the hardware and software system of the present invention is the division of labor between decoding functions performed by the software and decoding functions performed by the hardware. This allows the MPEG decoding system of the present invention to be highly flexible, and with the proper instructions, to decode multiple MPEG streams, in effect, simultaneously. Hence, multi-threaded moving video, still images, and varied image sizes can be decoded by the system of the present invention. The hardware architecture allows all these situations to coexist with the software controlling distribution of image data, and sequencing of data to the hardware decoding functions.

Figure 1:
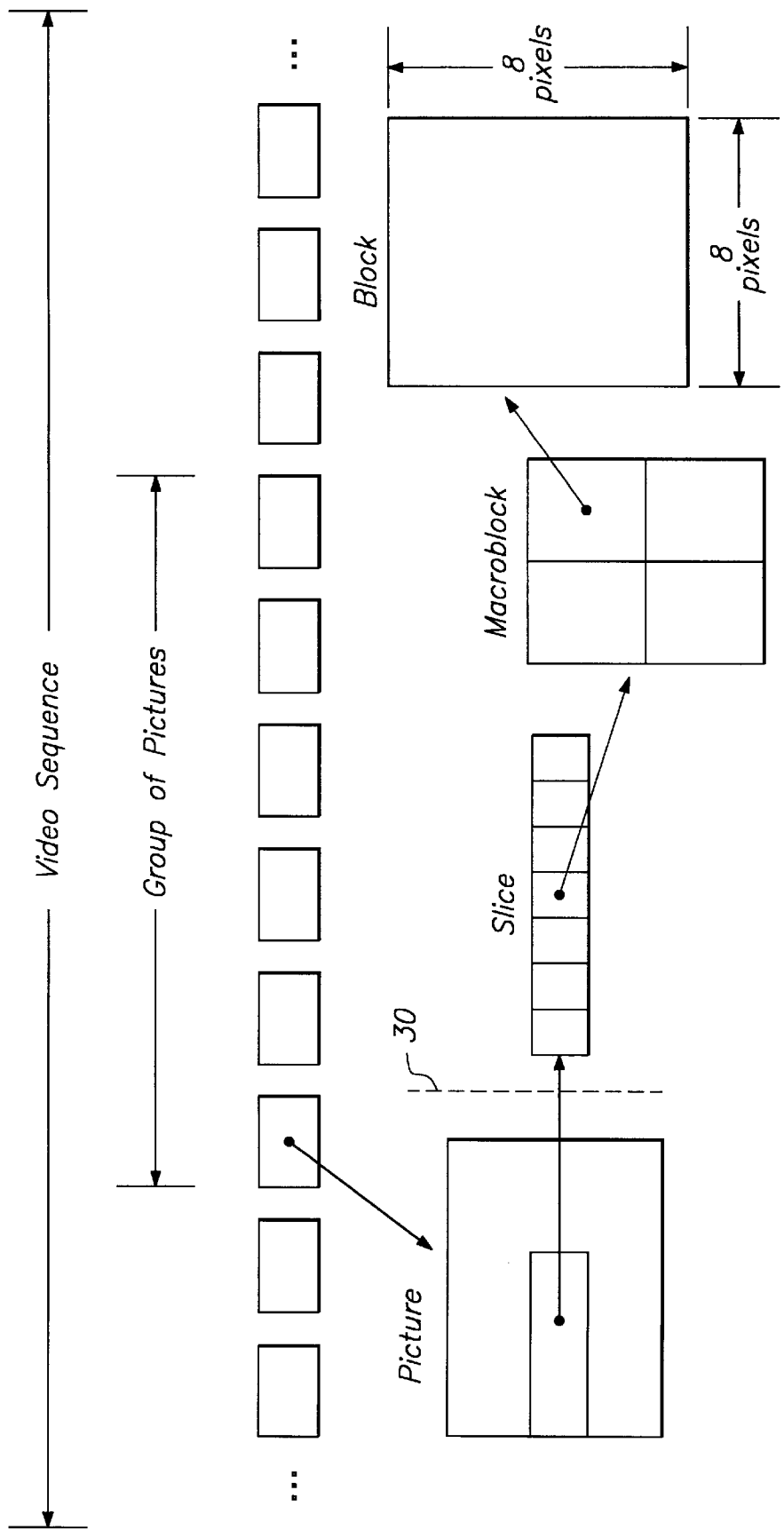
FIG. 1 is a block diagram of the MPEG coding structure and the breakdown of the distribution of functions in the system of the present invention.

FIG. 1 shows the breakdown of the division of labor between the hardware and software decoding functions of the system of the present invention. As shown in FIG. 1, a typical video sequence is broken down into a group of pictures, comprised of an I, P, and B-type pictures, which is comprised of slices of macroblocks, each macroblock containing an image block of 8×8 pixels and, possibly, encoded motion vector data. Line 30 represents the division of labor between the software portion of the system and the hardware portion of the system. Thus, in decoding a video sequence, the software portion of the system will search the video sequence, determine the group of pictures ordering, and sequence the ordering of the pictures to be decoded to the hardware portion of the system. The hardware component of the system decodes image and motion vector information at the slice, macroblock, and block level in accordance with the MPEG-1 decoding standard and the following description.

SYSTEM OVERVIEW

Figure 2:
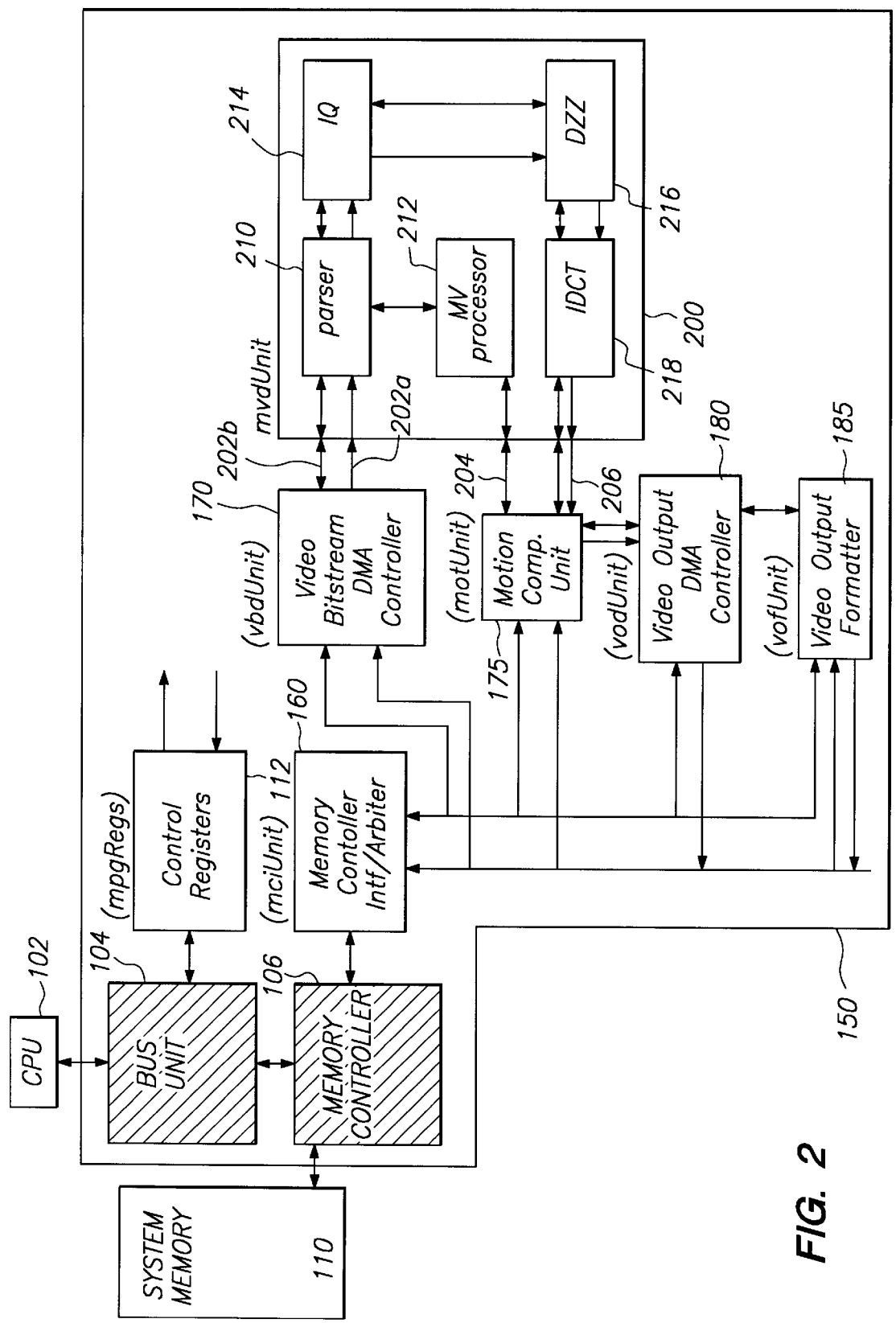
FIG. 2 is a block overview diagram of the system hardware and MPEG decoding unit hardware in accordance with the present invention.

FIG. 2 shows a general overview of the hardware components of a decoding system in accordance with the present invention.

The hardware architecture of the present invention as shown in FIG. 2 may reside in a host system, or be incorporated as part of an application specific integrated circuit (ASIC) 150 which is itself incorporated into a host system. For example, the host system will include a system memory 110, a central processing unit (CPU) 102, an address and data bus 104, and a system memory controller 106. MPEG unit hardware control registers 112, which are accessible to the CPU and decoding hardware, may be provided and include system status and configuration information. The control registers 112 are configurable by the CPU 102 for use by the decoding system of the present invention. Such control registers are defined herein in conjunction with their function relative to given components. System memory 110 generally comprises synchronous dynamic random access memory (SDRAM). As shown in FIG. 2, MPEG decoding hardware 200 may be included on ASIC 150. The host system or ASIC 150 may include other hardware components for performing multimedia application specific processing such as, for example, digital signal processing, advanced video processing, and interfacing with other components of the host system. CPU 102 may comprise a PowerPC class microprocessor manufactured by IBM Microelectronics and Motorola.

System memory 110 will contain MPEG-encoded video data which must be decoded by the MPEG decoding system in a coded data buffer. System memory 110 is configured to include reference buffers, display (or "output") buffers, and a strip buffer which are accessible by decoding hardware 200 and the system CPU 102.

As shown in FIG. 2, a memory controller interface and arbiter 160 handles all communication between system memory 110 and the MPEG decoding hardware 200. Memory controller interface 160 will handle requests from a video bitstream DMA controller 170 which issues requests to read bitstream data into a buffer contained in the DMA controller 170; requests from a motion compensation unit 175 to read data into the motion compensation unit 175; requests from a video output DMA controller to write to the video output DMA controller 180; and read and write requests from a video output formatter 185. Arbitration between all the MPEG requesters is handled by memory controller 160. Memory controller 160 can handle simultaneous, independent requests to several memory groups as discussed herein.

Video bitstream DMA controller 170 supplies coded data to the MPEG decoding unit 200. As explained in further detail below, a FIFO unit in DMA controller 170 contains data waiting to be transferred to a parsing unit 210, which is present in the MPEG decoding hardware 200. As space becomes available in the FIFO, video bitstream DMA controller 170 initiates memory requests to the memory arbiter 160 to refill the FIFO.

MPEG decompression hardware 200 performs the video decompression algorithm on the slice layer and below, including parsing of the video bitstream, entropy (Huffman or, more generally, variable length decoding (VLD)), inverse quantization, the inverse discrete cosine transform, and motion compensation. Three interfaces are provided to the MPEG decompression hardware 200: the coded data interface 202, the motion compensator interface 204, and the decoded data interface 206. Decoded data interface 202 includes a data provision interface 202a, and a communication protocol interface 202b. Communication protocol interface 202b utilizes a request/acknowledge protocol to communicate with the video bitstream DMA controller 170. When decompressing predicted macroblocks, MPEG core unit 200, and specifically motion vector processor 212, supplies the pixel location of the prediction data in advance of the time the data is actually needed on line 204. Motion compensation unit 175 may then fetch the appropriate data from system memory 110. Decoded data comes out of port 206 in a block order, but without the zig-zag configuration. Five logical blocks are shown as comprising the MPEG core decoding hardware 200: the parsing unit 210, a motion vector processor 212, an inverse quantization unit 214, a "de-zig-zag unit" 216 and an inverse discrete cosine transform unit 218.

Motion compensation unit 175 converts pixel addresses of reference macroblocks supplied by the MPEG core hardware 200 to physical memory addresses in system memory 110 and initiates memory transactions with system memory 110 to acquire necessary data for motion compensation via the memory controller 160. The motion compensation unit will perform half-pixel interpolation, if necessary, and store the prediction value in a local register until the corresponding pel is available at the output 206 of core hardware 200. At that time, the prediction data and the output of the core hardware 200 (specifically IDCT 218) are combined by the motion compensator unit 175. The combined data may be stored in a strip buffer by video output DMA controller 180. There is sufficient storage in the motion compensation unit 175 to ensure that no memory transaction has to be repeated during the duration of a macroblock.

Video output DMA controller 180 transfers decompressed data from the motion compensation unit 175 and the MPEG core hardware 200 to system memory 110. A buffer in the output DMA controller 180 temporarily stores decompressed pixels on their way to system memory 110. After the output DMA controller 180 accumulates enough data for a bus transaction, the output DMA controller calculates an address in system memory 110 where the data should be written and initiates the appropriate memory transaction via the memory controller interface 160. The DMA controller passes entire frames to the output formatter 185.

Video output formatter 185 converts images from the native MPEG format to one of several formats utilized by the host system. As discussed in further detail below, the output formatter contains a color space converter, dither circuit, and quantizer.

If the luminance/chrominance data is in a 4:4:4 format, it may also be directly passed to the output. The color space converter transforms the MPEG data to the RGB (red/green/blue) domain for use in three-dimensional rendering. The quantizer optionally converts 24 bit pixels to 16 bit pixels.

System Control Registers

As noted above, control registers 112 have a default configuration and may be configured by software instructions to CPU 102. Specific registers configured for functions of individual hardware elements are described in the following sections pertaining to such elements. Registers 112 are configured for system configurations and system interrupts as follows:

TABLE 1

MPEGUnit Configuration Register Bit Descriptions

| Name | Bit(s) | Type | Description |
|---|---|---|---|
| (reserved) | 0:18 | x | reserved |
| vofRdEnable | 19 | RW | output formatter read enable |
| vofWrEnable | 20 | RW | output formatter write enable |
| vofReset_n | 21 | RW | output formatter reset |
| vodEnable | 22 | RW | Video Output DMA Enable |
| vodReset_n | 23 | RW | Video Output DMA Reset |
| motEnable | 24 | RW | Motion Estimator Enable |
| motReset_n | 25 | RW | Motion Estimator Reset |
| mvdReset_n | 26 | RW | Decompressor Reset |
| parserStep | 27 | RW | Parser Step Control |
| parserEnable | 28 | RW | Parser Enable |
| parserReset_n | 29 | RW | Parser Reset |
| vbdEnable | 30 | RW | Video Bitstream DMA Enable |
| vbdReset_n | 31 | RW | Video Bitstream DMAReset |

TABLE 2

Interrupt Enable

| Name | Bit(s) | Type | Description |
|---|---|---|---|
| (reserved) | 0:24 | x | reserved |
| Strip Buffer Error | 25 | RW | error in output dma with strip buffer enabled |
| Everything Done | 26 | RW | output formatter, parser done |
| Output Formatter | 27 | RW | formatting complete |
| Output DMA | 28 | RW | DMA complete |
| Bitstream Error | 29 | RW | parser bitstream error |
| End Of Picture | 30 | RW | from parser |
| Video Bitstream DMA | 31 | RW | buffer exhausted |

TABLE 3

Interrupt Status

| Name | Bit(s) | Type | Description |
|---|---|---|---|
| (reserved) | 0:24 | x | reserved |
| Strip Buffer Error | 25 | RW | error in output dma with strip buffer enabled |
| Everything Done | 26 | RW | output formatter, parser done |
| Output Formatter | 27 | R | formatting complete |
| Output DMA | 28 | R | DMA complete |
| Bitstream Error | 29 | R | parser bitstream error |
| End Of Picture | 30 | R | from parser |
| Video Bitstream DMA | 31 | R | buffer exhausted |

Video BitStream DMA Controller

Figure 3:
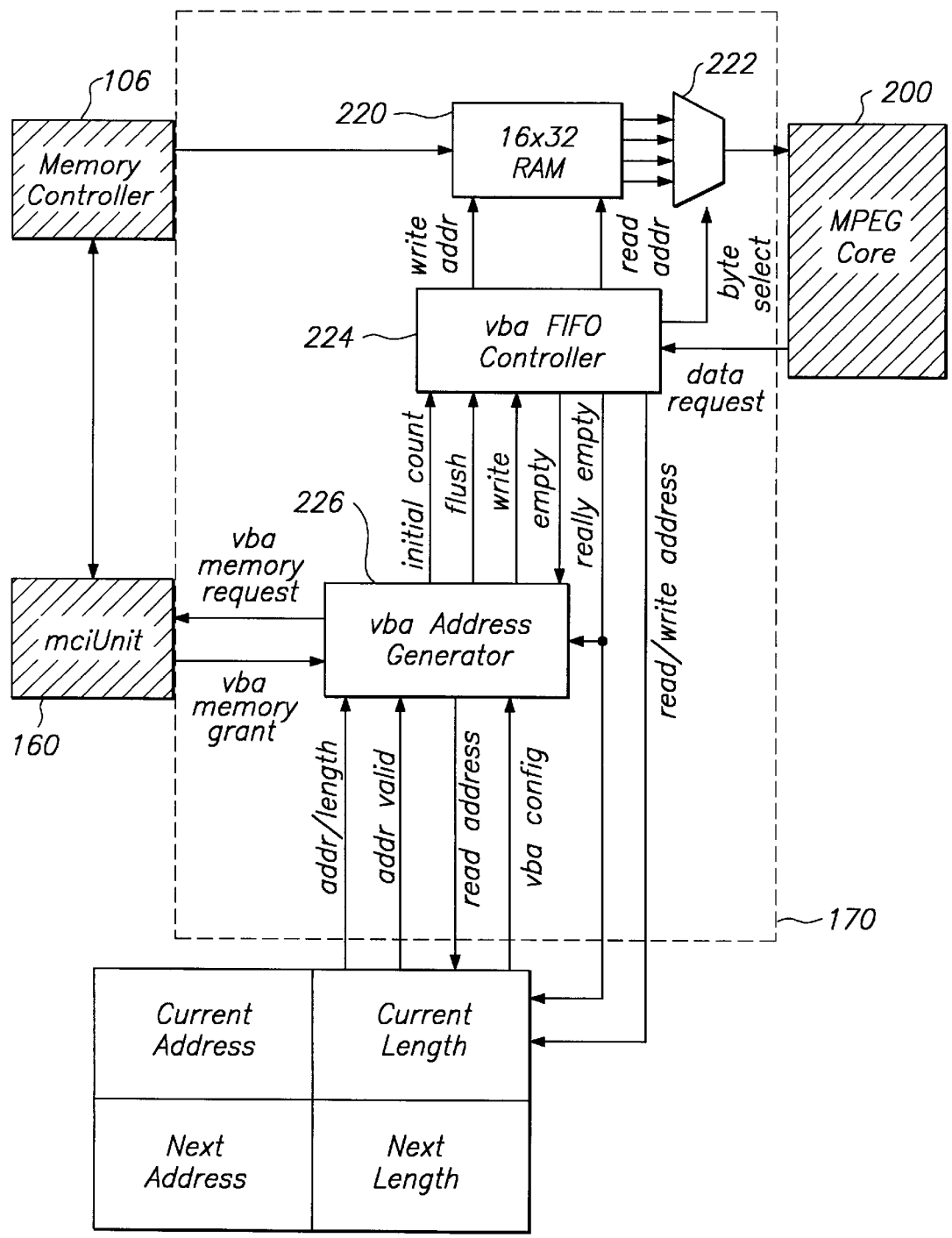
FIG. 3 is a block diagram of the video bitstream DMA controller shown in FIG. 2.

FIG. 3 is a hardware block diagram of the video bitstream DMA controller block 170 shown in FIG. 2. As shown in FIG. 3, the bitstream DMA controller 170 includes a 16×32 RAM 220, a multiplexer 222, a FIFO controller 224, and an address generator 226.

Video bitstream DMA controller 170 reads coded data from system memory 110 and places it into FIFO register 220. Generally, the parser unit 210 takes the data from the FIFO at a highly variable rate depending on the characteristics of the coded video bitstream.

Coded data buffers (see FIG. 13) in system memory 110 may begin on any byte boundary and may be any number of bytes long. DMA controller 170 has its own queue of two address and length registers that tell it where in system memory 110 the coded data resides. Each time video bitstream DMA controller 170 exhausts a coded data buffer in main memory 110, it returns an interrupt to the CPU and begins reading coded data from the next valid address in the DMA controller queue of addresses. The queue of two buffer addresses is provided in a Current Address Register (Table 4) and a Next Address Register (Table 6) in DMA controller 170 and reduces the urgency of the end of buffer interrupt of DMA controller 170. Each buffer address consists of a (byte-aligned) memory address (Tables 4, 6) and a length in bytes (Tables 5, 7). To place a buffer address in the queue, the CPU must first write a 23-bit physical memory address to the Next Address Register (Table 6) and then a 16-bit length to the Next Length Register (Table 7) in the DMA controller 170. When a data buffer is exhausted, the DMA controller 170 optionally generates an interrupt, and moves on to the next buffer specified in the Next Address Register. After an end-of-picture interrupt is generated by the parsing unit 210, registers in the DMA controller 170 may be examined to determine where the first start code following the end-of-picture occurred.

The hardware registers for implementing the aforementioned description are as follows:

TABLE 4

Bitstream Unit DMA Current Address Register

| Name | Bit(s) | Type | Description |
|---|---|---|---|
| (reserved) | 0:6 | x | reserved |
| Current Address | 7:31 | R | next read address |

TABLE 5

Video Bitstream DMA Current Length

| Name | Bit(s) | Type | Description |
|---|---|---|---|
| (reserved) | 0:14 | x | reserved |
| Current Length | 15:31 | R | bytes remaining in current buffer |

TABLE 6

Video Bitstream DMA Next Address

| Name | Bit(s) | Type | Description |
|---|---|---|---|
| (reserved) | 0:6 | x | reserved |
| Next Address | 7:31 | RW | next buffer address |

TABLE 7

Video Bitstream DMA Next Length

| Name | Bit(s) | Type | Description |
|---|---|---|---|
| (reserved) | 0:14 | x | reserved |
| Next Length | 15:31 | RW | next buffer length |

TABLE 8

Video Bitstream DMA Config/Status

| Name | Bit(s) | Type | Description |
|---|---|---|---|
| (reserved) | 0:14 | x | reserved |
| vbd snoop enable | 15 | RW | enable snooping on vbd reads |
| (reserved) | 16:26 | x | reserved |
| Buffer Byte Count | 27:31 | R | number of bytes buffered |

FIFO controller 224 monitors the fullness of the 16×32 RAM 220 containing coded data on its way to parsing unit 220. Each time the data request from the parser unit 210 becomes valid, FIFO controller 224 moves on to the next 16 bits to be transferred. The memory address queue is provided in address generator 226 and is incremented every four bytes. When RAM 220 becomes half empty or more, FIFO controller 224 makes a request to the address generator 226. Address generator 226 initiates a memory transfer via memory controller 160. When the data becomes available, the address generator inserts a write signal to FIFO controller 224.

A soft reset and enable for bitstream DMA controller 170 are provided in the MPEG unit configuration register. A zero in the vbdReset bit location disables operation of the DMA controller 170; for normal operation, a "1" is written to this bit. If during normal operation, the bit transfers from a "1" to a zero, the DMA address queue is flushed and the remaining contents of the bitstream FIFO are immediately invalidated. Setting this bit to "0" is equivalent to a soft reset of the DMA controller 170. The vbdEnable bit is a bitstream enable bit, which, when disabled, pauses DMA controller 170.

The DMA controller next address queue includes a bitstream unit address queue control bit (Next Address) which, when written to, places a new value in the next location of the address queue. Note that the address does not become a valid entry in the queue until the corresponding write to the length register (Next Length) occurs. The address is 25 bits long and the 25 bits uniquely specify a byte location in system memory 110. Any byte alignment is allowed. Registers implementing the address queue may be individually read via a direct memory mapping for diagnostic purposes.

The bitstream unit current length queue (Video Bitstream DMA Current Length) corresponds to the address queue (Video Bitstream DMA Current Address). Each entry in the length specifies the number of bytes to be read from the segment of the bitstream beginning at the address contained in the corresponding entry of the address queue. Entries in the length queue are 16 bits long, allowing each buffer segment to be up to 64 Kbytes. Writing the length queue actually causes a new entry to be placed in the queue; a write to the address queue does not cause an update. Therefore, the address should be written before the length when adding a new segment to the length queue. If there are no valid addresses in the address queue, the address/length immediately becomes the current address for the DMA controller 170. If there is one valid address, the address length becomes the current value only after the buffer presently being read is exhausted.

The Bitstream Unit DMA current status register of the DMA controller allows the CPU to determine where in memory the DMA controller unit is currently reading from. This is particularly useful at the end of a picture in the case of a bitstream error.

MPEG CORE HARDWARE

The MPEG core hardware 200 is defined as the parsing unit 210, inverse quantization unit 214, motion vector processor 212, de-zig-zag unit 216, and inverse discrete cosine transform unit 218.

In general, parsing unit 210 turns the MPEG bitstream (slice layer and below) into a series of motion vectors and run/level pairs that are passed on to the motion vector processor 212 and inverse quantization unit, respectively. The inverse quantization unit decodes the run/level pairs (using Q-tables decoded from the bitstream by the system CPU 102), reconstructs the frequency domain discrete cosine transform samples as per the MPEG-1 specification, and passes them to the de-zig-zag unit 216. The de-zig-zag unit contains memory to "de-zig-zag" the data recovered from the MPEG stream. The inverse discrete cosine transform unit transforms the frequency domain data into the spatial domain. Motion vectors from the parser unit 210 are transferred to the motion vector processor 212. Motion compensation unit 175 combines the prediction generated by the motion vector processor with the output from the inverse discrete cosine transform unit 218 and passes the results on to the video output DMA controller 180.

Parsing Unit

Figure 4:
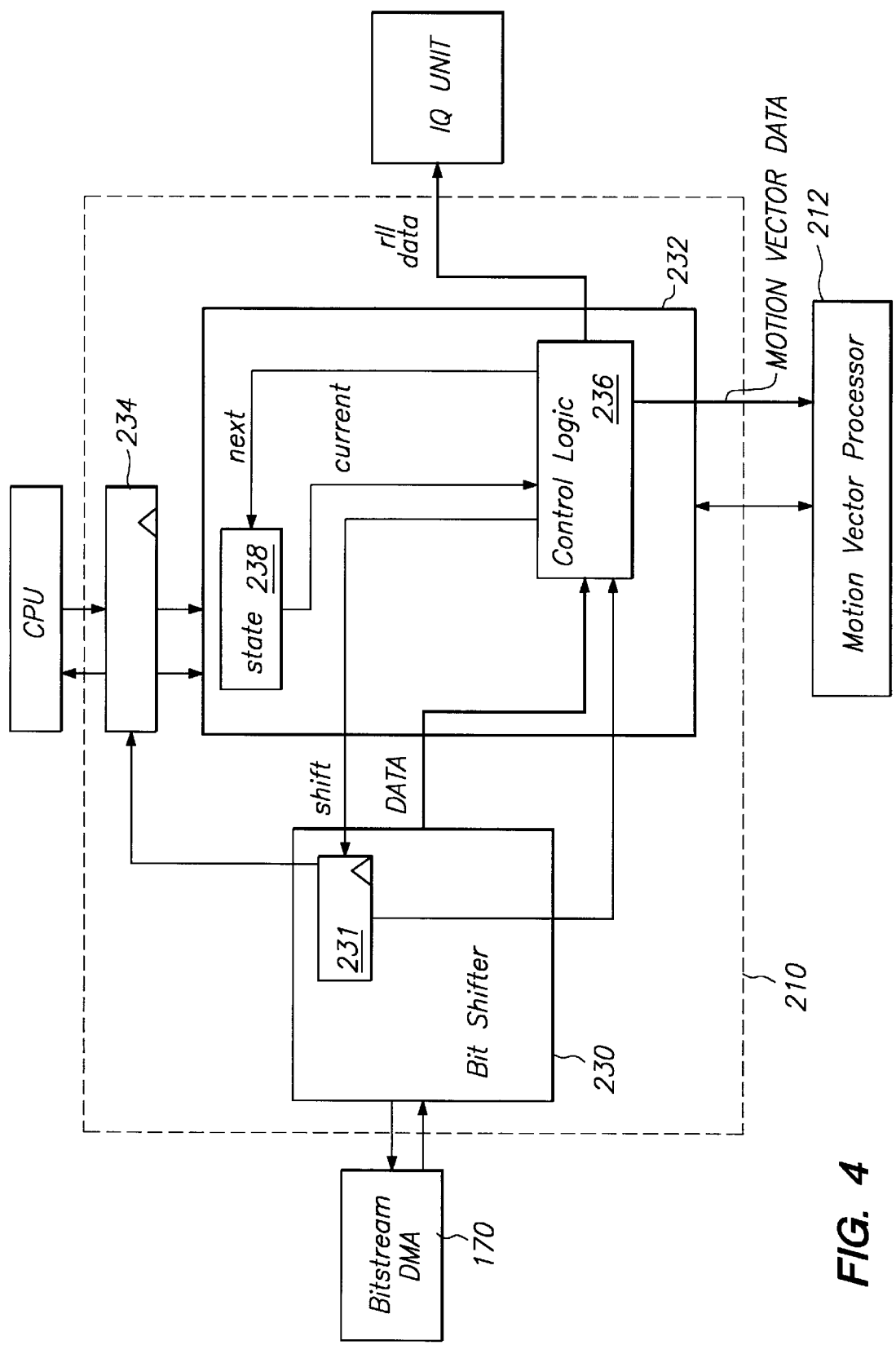
FIG. 4 is a block diagram of the parsing unit shown in FIG. 2.

FIG. 4 shows a block diagram of the parsing unit 210 utilized in the MPEG core decompression hardware 200. Parser unit 210 includes a bit shifter 230, parser state machine 232 and registers 234. The parsing unit 210 must be programmed with the variables picture_Coding_Type, forward_R_Size and backward_R_Size as decoded from the bitstream by the CPU under the instructions provided in the system of the present invention. It should be recognized that these variables need not be present in a bitstream format, but can be decoded from coded data in a different data structure more suitably used for interactive formats. The following values reside in the parser configuration register set forth below:

TABLE 9

Parser Configuration

| Name | Bit(s) | Type | Description |
| --- | --- | --- | --- |
| (reserved) | 0:2 | x | reserved |
| full_pel_backward_vector | 3 | RW | from picture header |
| (reserved) | 4 | x | reserved |
| backward_r_size | 5:7 | RW | from picture header |
| (reserved) | 8:10 | x | reserved |
| full_pel_forward_vector | 11 | RW | from picture header |
| (reserved) | 12 | x | reserved |
| forward_r_size | 13:15 | RW | from picture header |
| (reserved) | 16 | x | reserved |
| priorityMode | 17:19 | RW | priority request control |
| (reserved) | 20:28 | x | reserved |
| picture_coding_typing | 29:31 | RW | from picture header |

The parser configuration register contains the reset and enable bits for the parser. The parser configuration register contains parameters that must be decoded from the picture layer of the bitstream. This register is only written while the parser is in reset mode.

The image size register, produced below, allows the parser to determine the relative addresses of the prediction of a predictive coded (p-picture) macroblock. It should only be modified while the parser is in reset. MPEG Specification 11172-2 specifies the proper decoding of the variables mp_height and mp_width.

TABLE 10

Image Size

| Name | Bit(s) | Type | Description |
| --- | --- | --- | --- |
| (reserved) | 0:15 | x | reserved |
| mb_height | 16:23 | RW | image width in macroblocks |
| mb_width | 24:31 | RW | image height in macroblocks |

The parser status register contains information for the CPU from parser 210. It is utilized for debugging and retrieving details about bitstream errors by the CPU from parser 210.

TABLE 11

Parser Status 0

| Name | Bit(s) | Type | Description |
| --- | --- | --- | --- |
| (reserved) | 0 | x | reserved |
| mb_row | 1:7 | R | current macroblock row |
| (reserved) | 8 | x | reserved |
| bitstreamError | 9 | R | 1 = bitstream error detected |
| error state | 10:15 | R | state where error occurred |
| eval bits | 15:31 | R | current bit shifter output |

TABLE 12

Parser Status 1

| Name | Bit(s) | Type | Description |
|---|---|---|---|
| (reserved) | 0:2 | x | reserved |
| blockNumber | 3:5 | R | current block number |
| macroblock_type | 6:10 | R | as in MPEG spec |
| numBits Valid | 11:15 | R | # of valid eval bits, from left |
| lastStartCode | 16:23 | R | last start code parsed |
| (reserved) | 24 | x | reserved |
| mb_column | 25:31 | R | current macroblock column |

Parser state machine 232 includes control logic 236 and a state register 238. Bit shifter 230 also includes a register 231. The bit shifter 230 shifts bitstream data up to 12 bit increments as defined by the control logic 236. As shown in Table 13, the control logic determines the amount of the shift necessary dependent upon the data being examined. The parser handles elements in the bitstream as data units, such as the quantizer information, macroblock stuffing, address increment, etc. Table 14 outlines the time necessary for each element to be handled by the parser. The amount of the bit shift allowed bit shifter 230 is directly dependent upon the data unit being handled. When information from the bitstream DMA unit is provided to the parser, the control logic will search the data for a start code in 12 bit increment shifts, 12 bits/clock cycle.

Control logic 236 determines the amount of the bit shift depending on the nature of the incoming data. The shift value is written to the bit shift register 231. For example, a start code in a video sequence comprises 23 consecutive zeros. The bit shifter will require 2 cycles, at 12 bits per cycle, to determine a start code. Table 13 outlines the number of cycles (and the MPEG 1 specification the size and type of data) which the parser requires to examine incoming data. The parser configuration registers 234 contain information derived from the stream header and allow the parser to determine the nature of the incoming data. Once the data type is determined, data can be shifted to the control logic which divides out the RLL and motion vector data to the IQ unit and the motion vector processor. The state register 238 in the parser state machine 232 can track the data type expected by the control logic by reading the bit shift register 231.

The following table details the number of cycles of the system timing clock expended by parser unit 210 in decoding various parts of the bitstream:

TABLE 13

Parser Performance

| Decoding Process | Performance |
|---|---|
| Look for slice header | 12 bits/cycle |
| Quantizer Scale | 1 tick |
| Slice Extra Information | 1 cycle if none present, 1 cycle per code otherwise |
| Macroblock Stuffing | 1 cycle if none present, 1 cycle per code otherwise |
| Macroblock Address Increment | 1 cycle for codes less than 4 bits, 2 cycles for longer codes, plus 1 cycle for each escape |
| Macroblock Type | 1 cycle |
| Motion Vectors | 1 cycle for each vector not present; otherwise, 1 cycle for the motion code if less than 4 bits, 2 cycles otherwise; plus 1 if R present -- times 2 to account for both H and V |
| Macroblock Pattern | 1 cycle, whether present or not; 2 cycles for codes longer than 4 bits |

TABLE 13-continued

Parser Performance

| Decoding Process | Performance |
|---|---|
| Block | There is a 1 cycle overhead at the beginning of each block while the parser decides what to do next |
| DC Term in I-coded Macroblocks | 3 cycles |
| Each R/L Code (including first in non-I-coded Macroblocks) | 1 cycle if code less than 4 bits, 2 cycles otherwise |
| Each R/L Escape | 2 cycles |
| End of Macroblock | 1 cycle |

Parser unit 212 directly detects certain error conditions. When the parser encounters an error, it generates an interrupt and freezes in its current state. The CPU can then examine the current state bits in the parser status register, and determine the type of error that caused the interrupt. The following table enumerates all of the detected error conditions and the state in which they are detected:

TABLE 14

Parser State Table

| Symbolic State Name | State Number (decimal) | Description of Error |
|---|---|---|
| HANDLE_START_CODE | 9 | Invalid slice start code (>mb_height) |
| QUANTIZER_SCALE | 10 | Quantizer_scale set to zero |
| MACROBLOCK_ADDRESS_INCREMENT | 13 | Invalid VLC for macroblock address increment |
| MACROBLOCK_ADDRESS | 14 | Invalid macroblock_address_increment after a slice start code (>mb_width) -- or -- decoded macroblock_address_increment causes decoding to go beyond the end of the picture (as defined by mb_height and mb_width) |
| MACROBLOCK_TYPE | 15 | Invalid macroblock type VLC |
| QUANTIZER_SCALE_MB | 16 | Quantizer_scale set to zero |
| MOTION_CODE | 18 | Invalid motion VLC |
| MACROBLOCK_PATTERN | 20 | Invalid coded_block_pattern VLC |
| DCT_DC_SIZE_LUMINANCE | 22 | Invalid VLC for dct_dc_size_luminance |
| DCT_DC_SIZE_CHROMINANCE | 23 | Invalid VLC for dct_dc_size_chrominance |
| DO_RUN | 27 | More than 64 samples decoded for one block |
| DECODE_RLP_STAGE1 | 32 | Invalid run/level VLC -- or -- more than 64 samples decoded for one block |
| DECODE_RLP_STAGE2 | 33 | Invalid run/level VLC -- or -- more than 64 samples decoded for one block |
| DECODE_RLP_ESCAPE_LEVEL | 35 | More than 64 samples decoded for one block |
| DECODE_RLP_ESCAPE_LONG | 36 | More than 64 samples decoded for one block |
| END_OF_SLICE | 30 | More than 12 consecutive zeros found that are not followed by a valid start code |

In a worst-case macroblock decode, the total number of cycles required would be 790 cycles. A worst-case macroblock would consist of an address increment code with more than 4 bits, an M-quant, 2 motion vectors of the long variety, a long pattern code, an all-escape or long R/L pair codes. Macroblock stuffing and address escapes will add one cycle per instance to the worst case number. The inverse discrete transform unit 218 can transform an entire macroblock in 1056 cycles, giving the parser approximately a 50% higher performance than the inverse discrete cosine transform unit. If macroblock stuffing is present, the parser's performance degrades; however, more than 300 stuffing codes would have to be inserted to lower the parser's performance to the level of the inverse discrete cosine transform unit.

Inverse Quantization Unit

The inverse quantization unit 214 decodes the run/length pairs and performs an inverse quantization on the incoming image blocks in accordance with the process outlined in the MPEG-1 specification. The inverse quantization unit 214 contains a 128 bit long word space for reading and writing quantization tables in the IQ unit 214. As noted above, the quantization tables are decoded by the CPU 102 and provided to IQ unit 214. These tables should only be accessed while the IQ unit 214 is in re-set.

De-Zig-Zag Unit

Figure 5A:
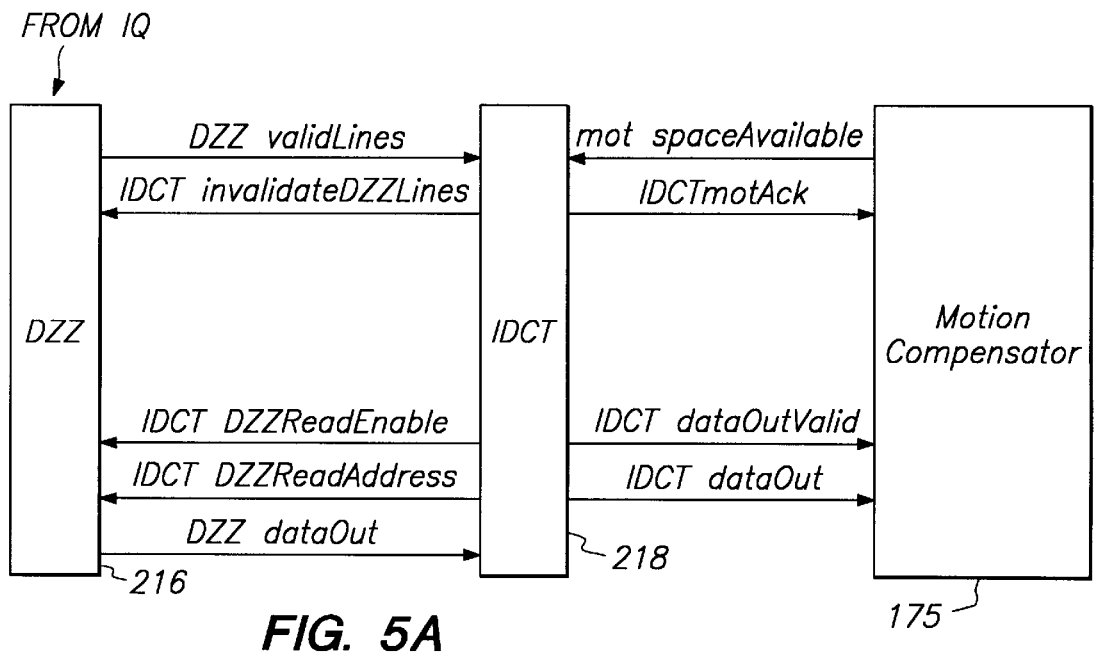
FIG. 5A is a block diagram of the interconnections of the zig-zagging unit, inverse discrete cosine transform unit, and motion compensation units shown in FIG. 2.
Figure 5B:
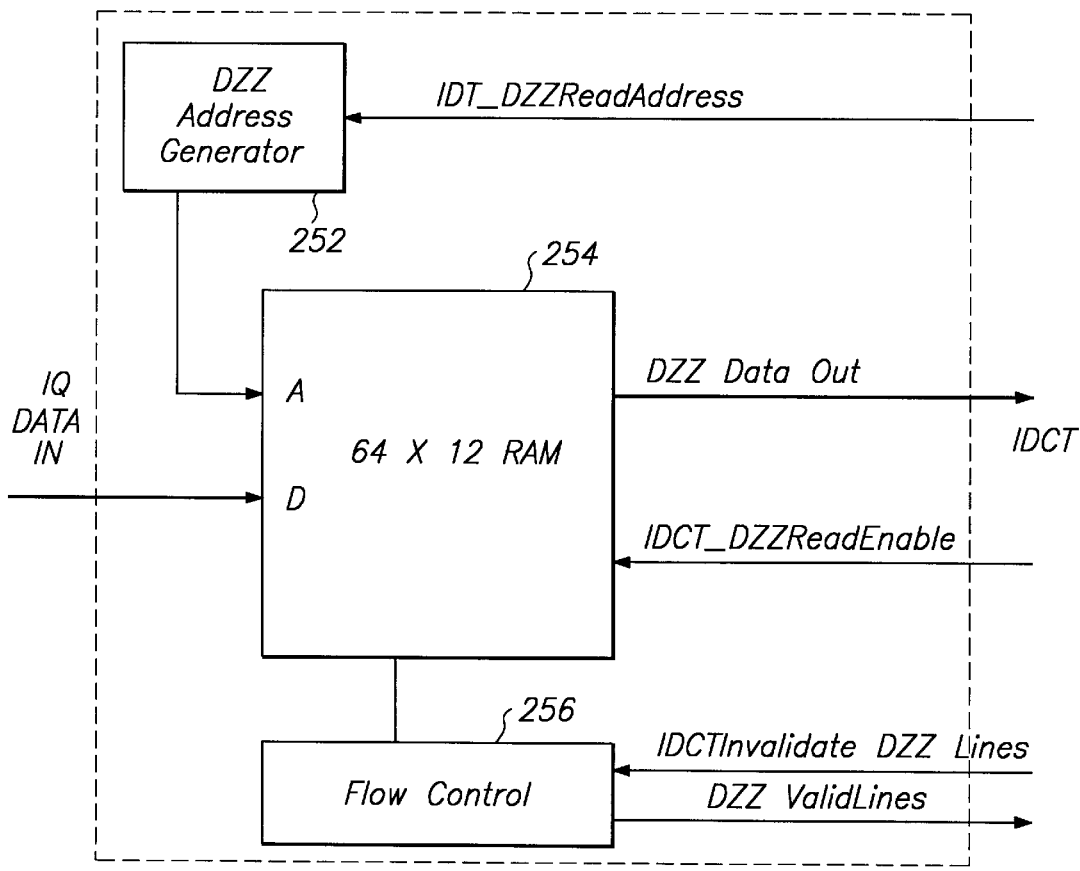
FIG. 5B is a block diagram of the de-zig-zag unit shown in FIG. 5A.

FIG. 5A shows the connections between the IDCT and the DZZ and motion compensation unit.

DZZ 216 includes a DZZ address generator, 64×12 RAM and flow control logic 256. Data from the IQ unit is written to RAM 254. Address generator 252 selects the data address for a data read so that data out of RAM 254 is in an inverse zig-zag format.

The IDCT/DZZ handshaking interface consists of the production of eight signals from the DZZ flow control 256 that indicate the availability of valid data (DZZ_Validlines). Each signal corresponds to one of eight vertical columns that comprise an 8×8 block of samples. After reading the data from a particular column of samples in RAM 254, IDCT 218 inserts the corresponding signal in the IDCT_invalidateDZZlines bus to inform DZZ 216 that the data has been read. DZZ 216 responds by lowering DZZ valid lines until the column contains new data.

The DZZ data interface provides a 6 bit read address from the IDCT 218 to the DZZ 216. The most significant 3 bits select the vertical column and the least significant bits select an individual sample within the column. The DZZ 216 latches the address from the IDCT 218 and provides the selected data before the end of the next clock cycle. IDCT 218 also provides an enable signal to allow power conservation of the random access memory within the DZZ.

Inverse Discrete Cosine Transform Unit

As noted above, inverse discrete cosine transform (IDCT) unit 218 transforms 8×8 blocks of frequency-domain input samples into 8×8 blocks of spatial domain pixels or differential pixels as specified in the MPEG-1 standard.

The IDCT 218 receives reconstructed frequency domain samples from DZZ 216, performs an inverse DCT to return the data to the spatial domain, and transfers the results to the motion compensator 175. Both interfaces to the IDCT 218 include handshaking. If data from DZZ 216 is unavailable, or the motion compensator 175 is not able to accept additional input, IDCT 218 will stall.

The IDCT and motion compensator handshaking interface includes a ready signal (MOT_spaceavailable) from the motion compensator 175 to the IDCT 218. Eight output values can be sent on the output data interface of IDCT 218. IDCT 218 responds to the request by the motion compensator 175 by asserting the IDCT_motAck to acknowledge that eight samples (comprising a horizontal row of pixels) will be available shortly. IDCT 218 asserts IDCT_dataOutValid when the samples actually appear at the output.

The IDCT data interface consists of a 9-bit, two's complement data bus (IDCT_dataOut) and a single bit data valid qualifier (IDCT_dataOUTVALID). The qualifier signal will be asserted for eight consecutive cycles following each assertion of IDCT_motAck. Each group consists of eight samples comprising a horizontal row of pixels (or differential pixel) outputs. The first group of eight corresponds to the uppermost row, and the outputs proceed downward to the bottom (8th) row of the macroblock. Within each row, the outputs occur in the following order, with zero as the leftmost output, 7 as the rightmost output: 0, 7, 3, 4, 1, 6, 2, 5. If mot_spaceAvailable remains asserted, and the IDCT 218 input data is not started, the IDCT would produce one group of eight results every ten cycles.

Figure 6A:
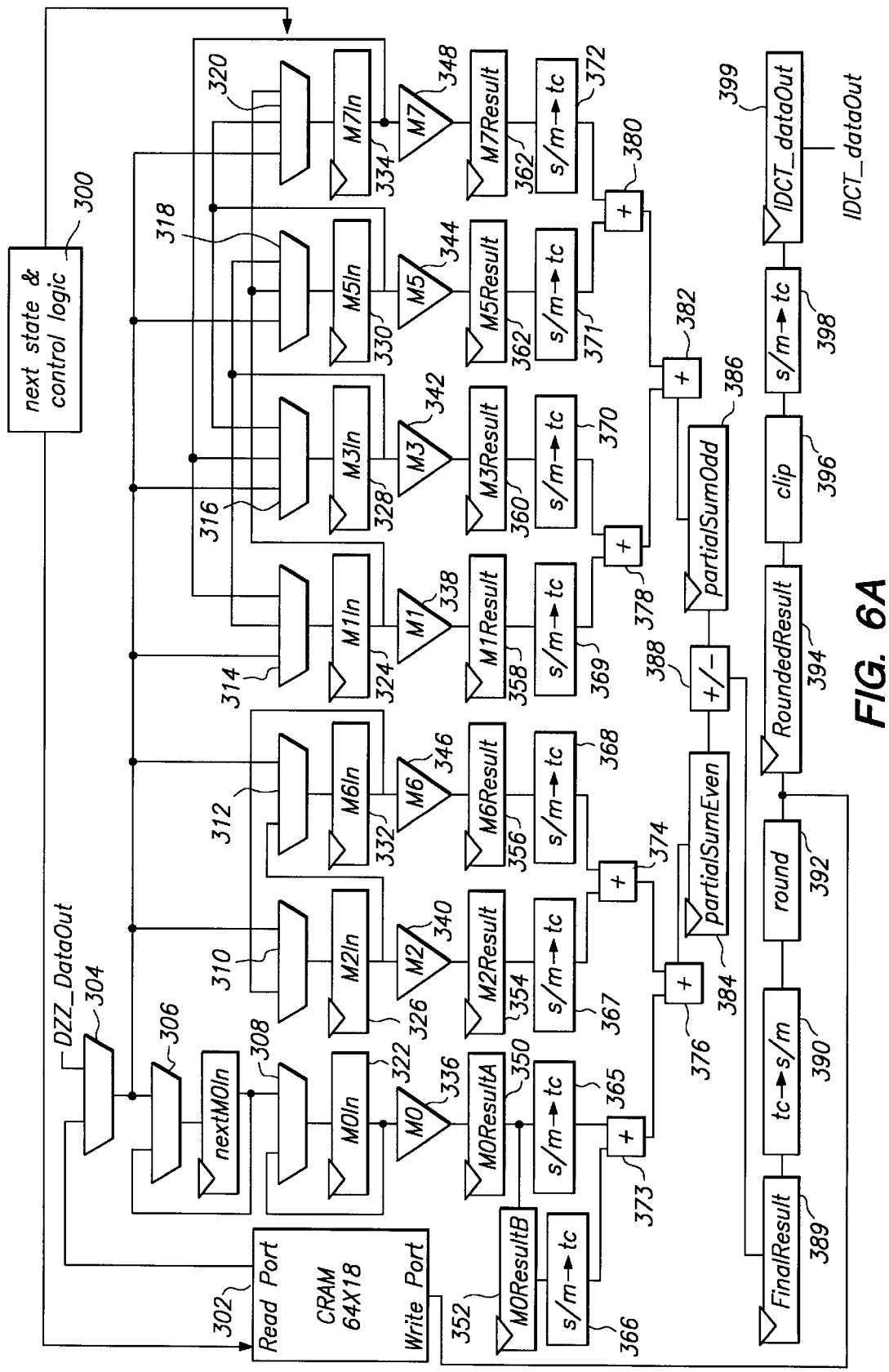
FIG. 6A is a block diagram of the inverse discrete cosine transform (IDCT) unit.

FIG. 6A is a block diagram of the inverse discrete cosine transform unit. The inverse discrete cosine transform unit takes advantage of the separability of the discrete cosine transform unit by doing is sixteen one-dimensional length eight inverse discrete transforms in order to calculate a single two-dimensional 8×8 inverse discrete cosine transform. Each one-dimensional inverse discrete cosine transform requires ten cycles to execute. A single two-dimensional inverse discrete cosine transform can be completed in 176 cycles per block or 1056 cycles per macroblock. The overall performance of the IDCT unit is thus 62,500 macroblocks per second at 66 Mhz. CCIR 601 video consists of 40,500 macroblocks per second, yielding more than 50% overhead above the CCIR 601 video rate. This allows for multiple threads of compressed data to essentially be decoded simultaneously.

As shown in FIG. 6A, the IDCT comprises control logic 300, a 64×18 CRAM 302, multiplexers 306–320, registers 322–334, multipliers 336–348, result registers 350–364, sine magnitude to two's-complement converters 365–372, adders 375–382, partial sum registers 384, 386, adder/subtracter 388, final result register 389, two's complement to sine-magnitude converter 390, rounding logic 392, rounded result register 394, clipper logic 396, sine-magnitude to two's complement converter 398, and IDCT_dataout register 399.

The DZZ_DataOut is provided to multiplexer 304 and is distributed to seven multipliers 336–348 and multiplexers 308–320. Only seven multipliers are required as one multiplier MO is used twice (since its the result of which is equivalent to the result of M4). FIG. 6C shows the multiplication ordering performed by the control logic for each of the eight iterations (0–7). Thus, the result of multiplier 336 is used in register 350 and register 352.

The separability of the DCT transform allows the performance of 16 one dimensional length IDCTs in order to obtain the single, two-dimensional 8×8 IDCT. The IDCT may not be halted in the middle of the computation of any one dimensional transform. It only stops after the transform has been completed, and either the motion compensation unit 175 is unable to accept new data or the DZZ cannot provide new input data. The IDCT will produce eight results each time it goes through the main sequence of states. These results will either be placed into CRAM 302 for vertical iterations, or loaded into the motion compensator 175 for horizontal iterations.

The IDCT control logic 300 loads the proper inputs from the DZZ or CRAM 302 and operates multiplexers 308–320 to control signals in the data path to produce the desired result. Normally, the IDCT control logic 300 cycles through a sequence of 11 states, however, three conditions cause the sequence to vary: assertion of reset, lack of valid data in the DZZ, and lack of space available in the motion compensation unit.

Figure 6B:
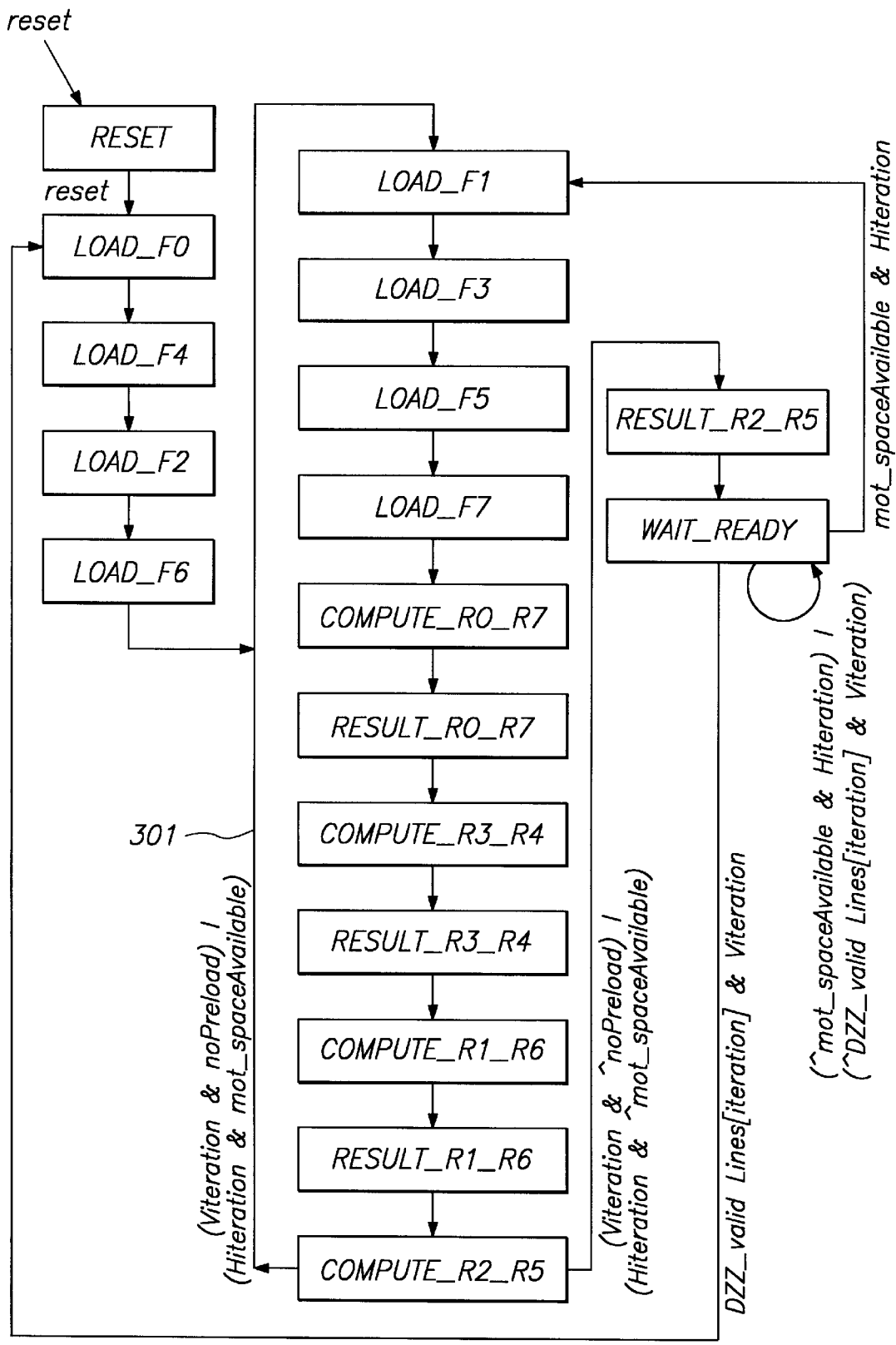
FIG. 6B is a flow diagram of the control logic process utilized in the IDCT unit shown in FIG. 6A.
Figure 6C:
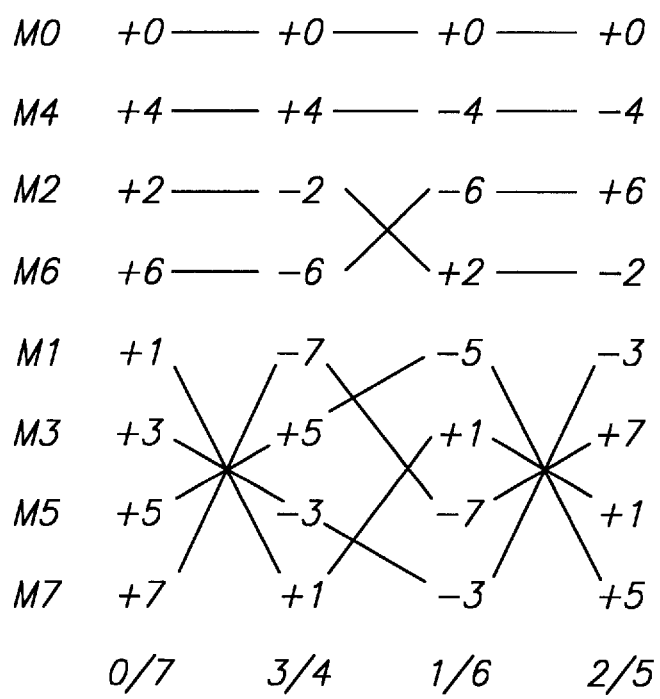
FIG. 6C is a representation of the calculations performed by the IDCT circuit of FIG. 6A.

FIG. 6B shows the possible states and transitions of the IDCT control logic state machine. The usual sequence of 11 states is shown in the center of the diagram, the reset/no data in the DZZ condition on the left and the motion compensator full state on the right.

The control logic performs eight horizontal and eight vertical iterations per two-dimensional IDCT. The iteration number is maintained in a separate register. The MSB of the iteration register determines whether a horizontal or vertical iteration is taking place. This is, in turn, used to create the read enable for the DZZ, write enable for the CRAM, and to make decisions the next state transition as outlined in FIG. 6B.

The reset state of the control logic sets-up the first four multiplications necessary for calculation of the IDCT (LOAD_F0, LOAD_F4, LOAD_F2 and LOAD_F6). The normal 11 stages for the IDCT are LOAD_F1, LOAD_F3, LOAD_F5 AND LOAD_F7 to set up the multiplexers to calculate the multiplication ordering shown in FIG. 6C, then computation and storing stages COMPUTE_R0_R7, RESULT_R0_R7, COMPUTE_R3_R4, RESULT_R3_R4, COMPUTE_R1_R6, RESULT_R1_R6, and COMPUTE_R2_R5. At this stage, depending on whether a horizontal or vertical iteration is being performed and whether space is available in the motion compensation unit, the control logic will either loop to the LOAD_F1 stage or store the COMPUTE_R2_R5 result in RESULT_R2_R5. If a vertical iteration is being performed and no preloading (DZZ_validLines-valid) is occurring, or a horizontal iteration is occurring and space is available in the motion compensation unit (mot_spaceAvailable), the LOAD_F1 sequence will be executed. If a vertical iteration is being performed and a preload is occurring, or if a horizontal iteration is being performed and no space is available in the motion compensation unit, the result of the COMPUTE_R2_R5 will be stored and the logic will wait at the WAIT_READY step until DZZ_validLines is valid during a vertical iteration, where the LOAD_F0 step will be executed, or the motion compensation unit has space available during a horizontal iteration.

The IDCT produces results during eight consecutive cycles out of 11 during normal operation. These eight cycles are qualified by the signal IDCT_dataOutValid.

Motion Vector Processor

Figure 7:
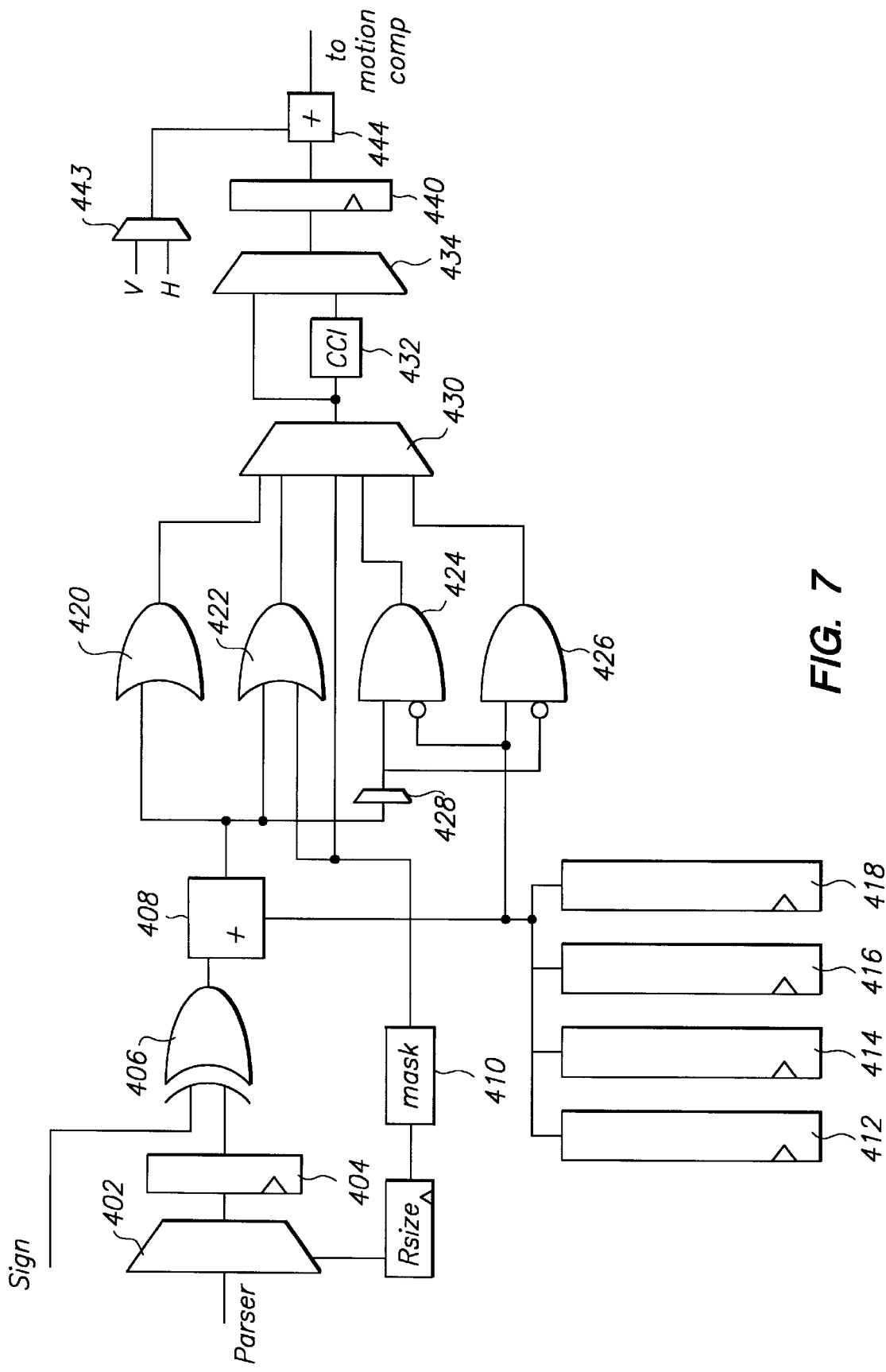
FIG. 7 is a logic diagram of the motion vector processor of the present system.

FIG. 7 is a block logic diagram of motion vector processor. The motion vector processor described with respect to FIG. 7 implements the decoding of forward and backward motion vectors in accordance with the MPEG-1 specification.

Motion vector processor reconstructs the value of the motion vectors in p-type and b-type macroblock pictures. The macroblocks motion vectors are decoded in accordance with the standards set forth in the MPEG 1 standard. In p-type macroblocks, first the value of the forward motion vector for the macroblock is reconstructed and a prediction macroblock is formed. Then, the DCT coefficient information, stored for some or all of the blocks is decoded, dequantized, inverse DCT transformed and added, in motion compensation unit 180, to the prediction macroblock.

In B-type macroblocks, according to the invention, first, the value of the forward motion vector for the macroblock is reconstructed from the retrieved forward motion vector information, and the backward motion vector for the macroblock is reconstructed from the retrieved backward motion vector information. The forward prediction and the backward prediction are then computed. Finally, the computed prediction is added to the differential pixels from the IDCT.

In motion vector processor 212, horizontal and vertical motion vector data is input from the parser to a bit shifter 402. Shifter 402 is coupled to a forward/backward_r_size register (the forward/backward_r_size values being computed from the picture header information in accordance with the MPEG-1 standard) and the shift of bit register 402 is determined based on the input data. The data is then shifted to an intermediate result holding register 404.

An overflow mask 410 is also generated and comprises the r_size shifted a quantity FFF (hex) to allow for checking of overflows in the picture boundary and allow the reference to "wrap" around picture boundaries. In accordance with the MPEG-1 defined process for reconstructing motion vectors, the reconstruction method implemented by motion vector processor begins by generating a complement to the horizontal or vertical, forward or backward r_values. A sign change control input is provided to an exclusive-OR gate which has, as its other input, the data from register 404. The sign change is implemented dependent upon the values of the forward/backward_r_size, again in accordance with the MPEG-1 specification. The output of XOR gate 406 is provided to an adder 408, which sums the output of XOR gate 406 with the previously retrieved values for the motion_horizontal_forward_r, motion_vertical_forward_r, motion_horizontal_backward_r, and motion_vertical_backward_r stored in registers 412–418 depending upon whether a horizontal or vertical motion vector is being processed.

The output of adder 408 is provided to OR gates 420,422 and AND gates 424, 426 along with mask 410 and the output of registers 412–418, and the output of a selector 428, which adds four to the value of the output from adder 408. The gate array performs computation of the current motion vector being decoded based on the values in registers 412–418 and the input data. A multiplexer determines the proper result of the gate array output being decoded, i.e., the positive values for the reconstructed horizontal or vertical motion vectors (recon_right, and recon_down, respectively).

The output of MUX 430 is provided to a bit shifter 432 and second MUX 434. The final portion of the motion vector reconstruction involves computing the whole and half-pel unit values from the reconstructed values. The reconstructed values the half-pel values are selected by MUX 434 and stored in register 440. Adder 444 sums the reconstructed value with a horizontal overhead selection value.

Motion Compensation Unit

Figure 8:
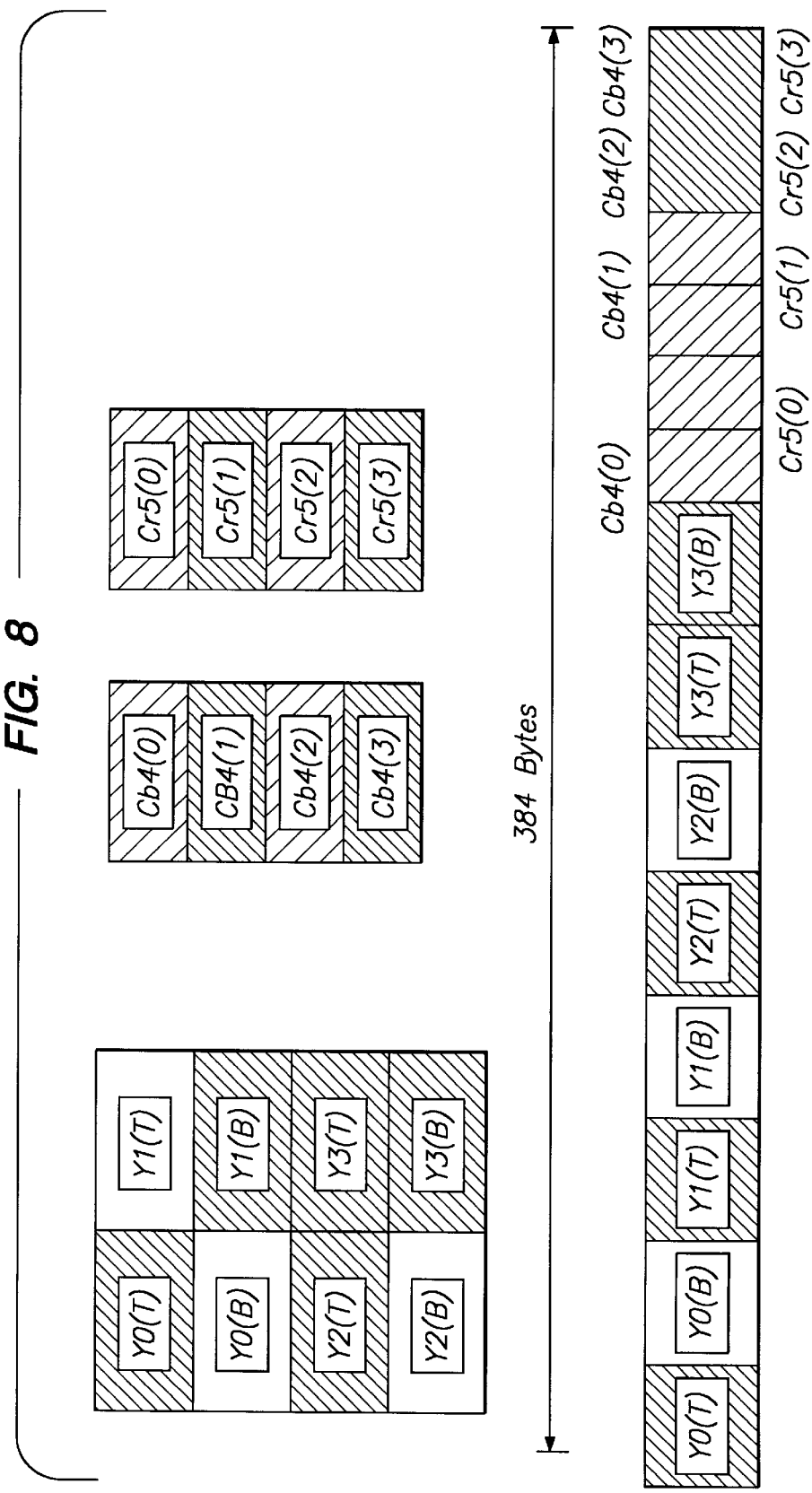
FIG. 8 is a block diagram of the macroblock configuration utilized in accordance with the present invention.

Each macroblock is stored in memory as 384 continuous bytes. Organization within each macroblock is shown in FIG. 8. Each luminance block is divided into two halves, T for top and B for bottom. The chrominance blocks are divided into quarters numbered 0–3 from top to bottom. The offset of the first byte of each of these elements in the macroblock is given by the table in FIG. 9. The sort address for any macroblock is given by base+[(H)(16)H$_{size}$+(V % 16)]×384. This allows for easy calculation in hardware (since 384 is 3×128).

The motion unit soft reset and enable bits (motReset and motEnable) are present in the MPEG unit configuration register. The address for the reference buffers (Reference 0 and Reference 1) (shown in FIG. 10) in system memory 110 must begin on a 4 KB boundary, giving 13 bits address for each buffer. The prediction address should be set to zero if the buffer is not present.

Figures 9, 10B:
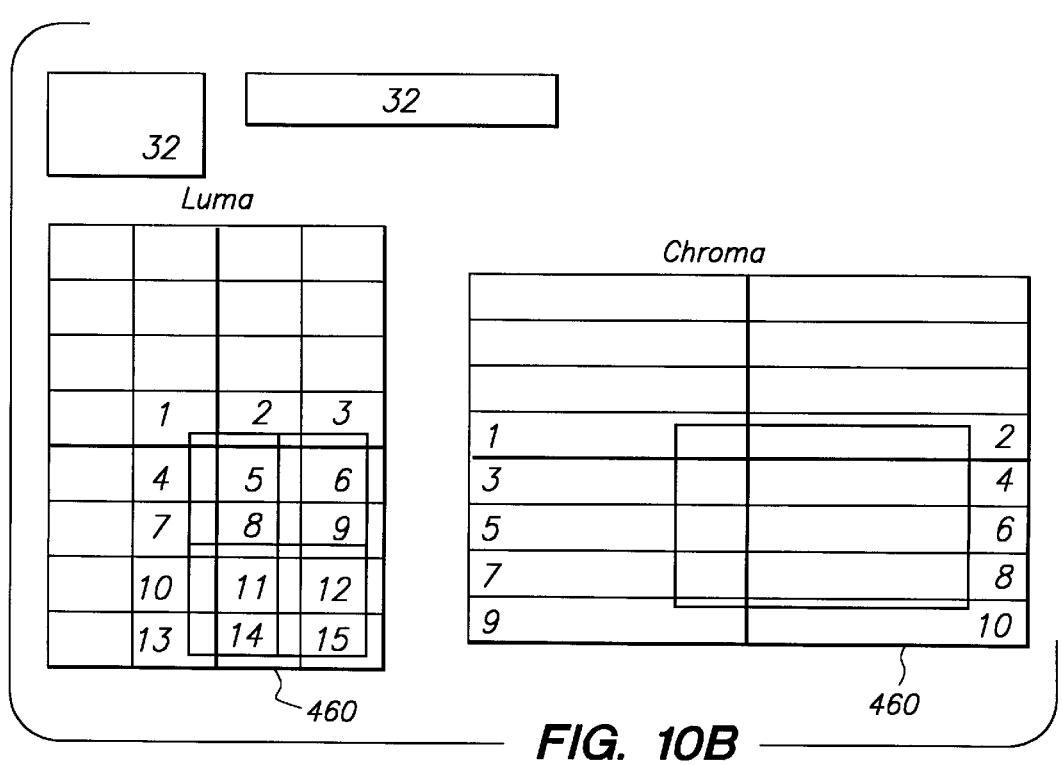
FIG. 9 is a table of the byte offsets for inserting the values from the macroblocks into the system memory.
FIG. 10B is an exemplary luminance and chrominance predictable macroblock.
Figure 10A:
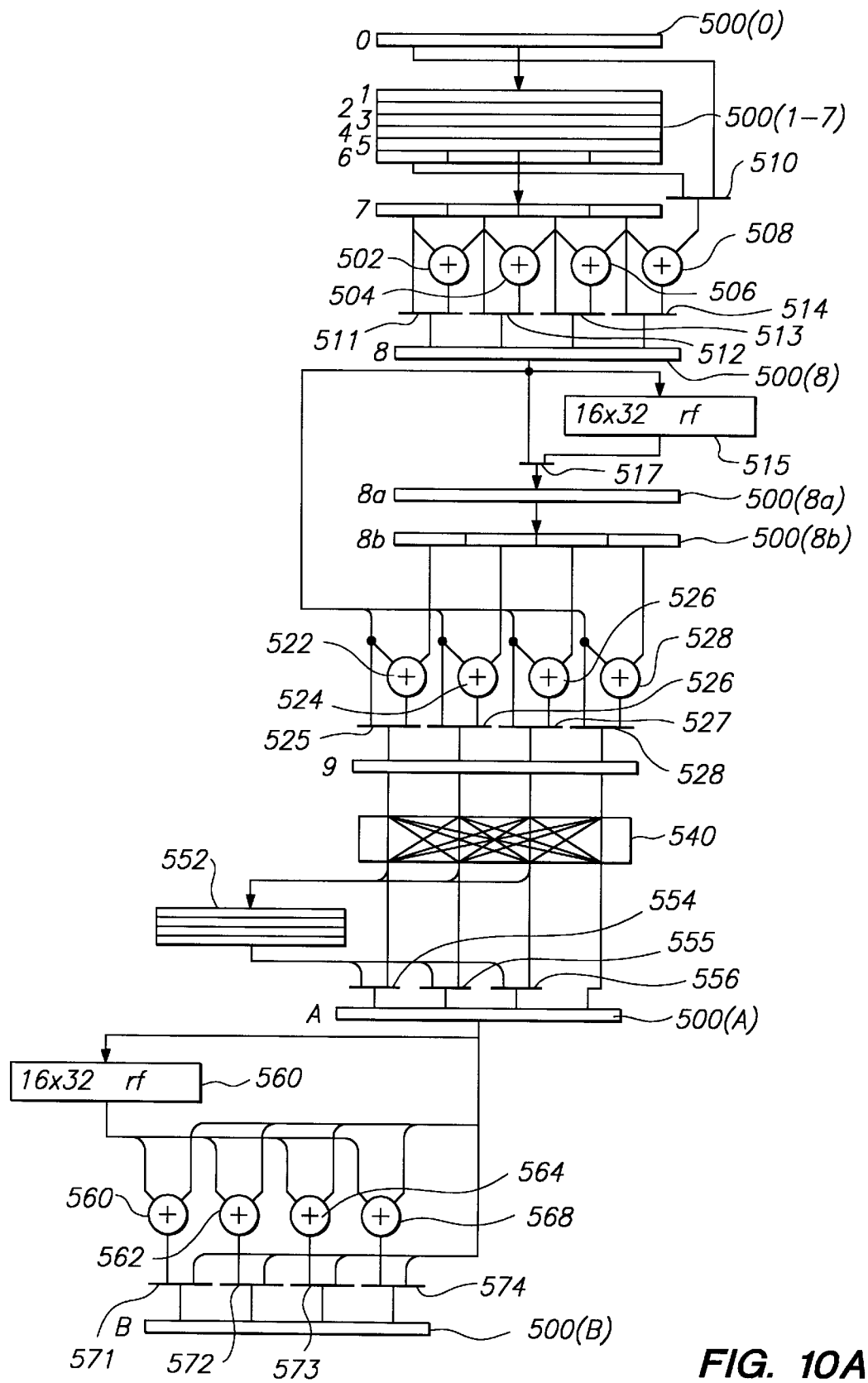
FIG. 10A is a block diagram of the data pipe for the motion compensation unit of the present system.

FIG. 10A shows the data pipe for the motion compensation unit utilized in the system of the present invention. The pipe consists of a series of registers MUXs and adders which accept 32 byte data segments of prediction data in the order defined in an exemplary macroblock shown in FIG. 10B. The addresses of the prediction buffers are held in registers as shown in the following tables:

TABLE 15

Forward Prediction Buffer Address

| Name | Bit(s) | Type | Description |
| --- | --- | --- | --- |
| (reserved) | 0:6 | x | reserved |
| forward prediction buffer address | 7:19 | RW | 4K aligned address |
| (reserved) | 20:31 | x | reserved |

TABLE 16

Reverse Prediction Buffer Address

| Name | Bit(s) | Type | Description |
| --- | --- | --- | --- |
| (reserved) | 0:6 | x | reserved |
| reverse prediction buffer address | 7:19 | RW | 4K aligned address |
| (reserved) | 20:31 | x | reserved |

Each scan is performed first for the forward prediction data, then for the backward prediction data. The pipe first performs horizontal compensation in stages 500(0) through 500(8), then vertical compensation in steps 500(8a) through 500(9) as described further below. In FIG. 10B, four blocks comprising a single macroblock are shown for the luminance values. The following description will be limited to the luminance values, though it should be readily understood that the pipeline processing is similar for the chrominance blocks also shown in FIG. 10B.

In FIG. 10B, a worst case block prediction is shown at 460. In this instance, the block is not horizontally or vertically aligned with any block segment, and thus, to retrieve the eight 32 byte segments making up a single block, fifteen 32 byte segments (numbered 1–15) must be read, since data will be needed from each of these segments to interpolate the values for the selected block 460. Each segment contains four rows of eight pixels each. These rows are inserted into the pipeline as pixel words in the following order:

| column | 0 | 1 |
| --- | --- | --- |
| row 0 | 0 | 1 |
| row 1 | 2 | 3 |
| row 2 | 4 | 5 |
| row 3 | 6 | 7 |

With reference to FIG. 10A, data enters the pipe in a series 32 bit registers 500(0–7) and is advanced register to register each clock tick. In a simple case, data is transferred sequentially through the registers to adders 502–508 which perform interpolation (if necessary) by averaging pixel data in adjacent 8-bit segments in register 500(7). However, as will be noted, adder 508 is coupled to multiplexer 510 which has inputs from registers 500(0) and 500(6). For proper interpolation, the "right-most" byte of the even numbered words gets averaged with the "left-most" byte of the odd numbered words. The right-most of the odd words must get averaged with the left-most of the corresponding even word in the adjacent chunk. For two adjacent words:

| A0 | A1 | B0 | B1 |
| --- | --- | --- | --- |
| A2 | A3 | B2 | B3 |
| A4 | A5 | B4 | B5 |
| A6 | A7 | B6 | B7 | which enter the pipe in the order: A0, A1, A2, A3, A4, A5, A6, A7, B0, B1, B2, B3, B4, B5, B6, B7, the even numbered words will find their right neighbor seven positions behind them in the pipe, while odd numbered words find their right neighbor 1 position behind. Thus, registers 500(0) and 500(6) provide selectable outputs to MUX 510 which allow the control logic for the motion compensator to average byte neighbors within a word, and the right-most byte of each word with the left-most byte of either the 1-tick or 7-tick delayed word. MUXs 511–514 allow for interpolation adders 502–508 to be bypassed when interpolation is not required (i.e., when the target block 460 is horizontally aligned within the luminance macroblock).

A 36 bit wide register 500(8) stores the interpolated (or non-interpolated) horizontal data in four 9-bit banks. Truncation is performed on the horizontally interpolated data during vertical interpolation and the end pixels are eventually thrown out.

Vertical interpolation is performed in a similar manner using adders 522–528 and multiplexers 525–528.

A 16×36 RAM 515 is provided to store the bottom row of each 32 byte segment and return it to the pipe at the proper instance. In vertical interpolation, each pel's neighbor directly above it can be found two clock ticks behind it in the data pipe. Thus registers 500(8a) and 500(8b) are provided to delay the data by two clock ticks before vertical averaging. In a luminance block, this means writing segments 6 and 7 into RAM 515, and reading them back into the pipeline via a MUX 517 into register 500(8a) before the top row of the next data segment reaches the vertical interpolation step.

Register 500(9) stores the interpolation result in a 32 bit register. The data is still aligned in the same format it had in system memory, although interpolated. A MUX 450 utilizes the lower few bits of the prediction address to move bytes horizontally and drop words vertically to shave off all but the prediction data. The horizontal swizzling requires that up to three bytes per row of each chunk be saved and joined with data from the next data segment. Thus a 24 bit wide 4 byte×3 byte array of flip-flops 552 stores this information for rejoinder by MUXs 554–556.

The pipe outputs accurate predictions for either forward, reverse, or both motion vectors. As noted above, the forward and reverse data alternates with each row of data segments (4 pel rows) that come from memory, At the input to the pipe, control instructions ensure that data is provided from the motion vector processor in the right order such that the if both the forward and reverse motion vectors are being predicted, the forward data never gets more than three pixel rows ahead of reverse and vice-versa. Tracking is performed to follow which prediction is ahead, and if data is received for the prediction that is ahead, it is stored in a second 16×32 RAM 560. If data is received for the trailing prediction, it can be interpolated with the data stored previously by adders 560–568 and MUXs 571–574.

After both forward and reverse interpolation, a fully reconstructed prediction is ready for reconstruction.

Register 500(B) holds the forward or reverse interpolated data.

Chrominance data is placed into the pipe in a manner similar to luminance, except that the pipe must account for the interleaved structure. Horizontal half-pel interpolation is the same, except the vertical interpolation requires saving and restoring the last row of a block twice as often. The realignment requires setting the chroma prediction as only 8×8 (×2) and forward/reverse interpolation treats the component type as an additional row bit.

Output DMA Unit

Addresses for the video output DMA unit 180 are the same as those in the prediction base address register (Tables 15 and 16). The output DMA unit has two modes: a reference frame format and a strip buffer format. In reference frame format, all the output is written contiguously into reference frame format. A strip buffer (FIG. 13) is used in system memory when passing data to save memory when passing non-reference frames to the output formatter. Data is written in 16 KB programmable buffer in system memory 110 aligned on a 16K boundary. The following table lists the output unit control registers:

TABLE 17

Output Control Register

| Name | Bit(s) | Description |
|---|---|---|
| Output Address | 19:31 | Physical base address of reference frame being written |
| RFU | 16:18 | |
| Output Mode | 15 | OXX -- Reference frame format; XOX -- Reference frame format with handshaking 100 -- 16 KB Strip; 101 -- 32 KB Strip; 110 -- 64 KB Strip; 111 -- 128 KB Strip |
| RFU | 0:13 | |

If any of the strip buffer output modes are enabled, the allocated buffer must be large enough to hold at least two rows of macroblocks. This number must be rounded to the next highest power of two (32 KB for 352 pel wide video). A reference frame format with handshaking allows writing to a full reference from format in memory while performing output formatting at the same time.

Video Output Formatter

FIG. 11 shows a block diagram of the video output formatter utilized in the system of the present invention. The video output formatter is operationally independent from the MPEG core hardware. This is another feature which allows multi-threaded decoding, since the core hardware may decode one stream while the formatter processes another.

The output formatter includes an input DMA interpolation raster 242, color space converter and dither filter 244, and a format conversion filter 246. The control registers set by CPU 102 in output formatter 185 are set forth as follows:

TABLE 18

Output Formatter Configuration

| Name | Bit(s) | Type | Description |
|---|---|---|---|
| (reserved) | 0:2 | x | reserved |
| vof snoop enable | 3 | RW | enable snooping on vof output |
| (reserved) | 4:6 | x | reserved |
| (reserved) | 4:9 | x | reserved |
| format | 11 | RW | 0 = 32 bit  1 = 16 bit |
| (reserved) | 16:18 | x | reserved |
| enable CSC | 19 | RW | YCbCr -> RGB conversion on |
| (reserved) | 20:22 | x | reserved |
| rowChunks | 23:31 | RW | number of 32B chunks per line |

TABLE 19

Output Formatter Cropping Control

| Name | Bit(s) | Type | Description |
|---|---|---|---|
| (reserved) | 0 | x | reserved |
| hStart | 1:7 | RW | starting horizontal MB offset |
| (reserved) | 8 | x | reserved |
| vStart | 9:15 | RW | starting vertical MB offset |
| (reserved) | 16 | x | reserved |
| hStop | 17:23 | RW | ending horizontal MB offset |
| (reserved) | 24 | x | reserved |
| vStop | 25:31 | RW | ending vertical MB offset |

TABLE 20

Output Formatter Input Buffer Address

| Name | Bit(s) | Type | Description |
|---|---|---|---|
| (reserved) | 0:6 | x | reserved |
| unformatted display buffer address | 7:19 | RW | 4K aligned address |
| (reserved) | 20:31 | x | reserved |

TABLE 21

Output Formatter Output Buffer Address

| Name | Bit(s) | Type | Description |
|---|---|---|---|
| (reserved) | 0:6 | x | reserved |
| formatted display buffer address | 7:26 | RW | 32B aligned address |
| (reserved) | 27:31 | x | reserved |

TABLE 22

Dither Matrix, Upper Half

| Name | Bit(s) | Type | Description |
|---|---|---|---|
| dither matrix (0,0) | 0:3 | RW | signed 4-bit error value |
| dither matrix (0,1) | 4:7 | RW | (set to 0 for no dithering) |
| dither matrix (0,2) | 8:11 | RW | — |
| dither matrix (0,3) | 12:15 | RW | — |
| dither matrix (1,0) | 16:19 | RW | — |
| dither matrix (1,1) | 20:23 | RW | — |
| dither matrix (1,2) | 24:27 | RW | — |
| dither matrix (1,3) through (1,3) | 28:31 | RW | — |

TABLE 23

Dither Matrix, Lower Half

| Name | Bit(s) | Type | Description |
|---|---|---|---|
| dither matrix (2,0) | 0:3 | RW | signed 4-bit error value |
| dither matrix (2,1) | 4:7 | RW | (set to 0 for no dithering) |
| dither matrix (2,2) | 8:11 | RW | — |
| dither matrix (2,3) | 12:15 | RW | — |
| dither matrix (3,0) | 16:19 | RW | — |
| dither matrix (3,1) | 20:23 | RW | — |
| dither matrix (3,2) | 24:27 | RW | — |
| dither matrix (3,3) through (3,3) | 28:31 | RW | — |

TABLE 24

Output Formatter Alpha Fill Value

| Name | Bit(s) | Type | Description |
| --- | --- | --- | --- |
| (reserved) | 0:23 | x | reserved |
| DSB | 24 | RW | control bit |
| alpha fill value | 25:31 | RW | 7-bit alpha channel fill value |

TABLE 25

Output Formatter Image Size

| Name | Bit(s) | Type | Description |
| --- | --- | --- | --- |
| (reserved) | 0:15 | x | reserved |
| mb_height | 16:23 | RW | image width in macroblocks |
| mb_width | 24:31 | RW | image height in macroblocks |

As shown in FIG. 11A, data from the output DMA controller is first converted to YUV444 format. FIG. 11B graphically represents the interpolation of the 4:2:2 data to 4:4:4 format by interpolation of the chroma pixels.

The colorspace conversion and dither block includes adapted conversion coefficients to both convert and amplify the output values of the data. The color value conversion flow is represented in FIG. 11C. The YCbCr components are first normalized, and the RGB components then computed at step 482. The dithering matrix from Tables 22 and 23 may then be applied. The format stage 246 is controlled relative to the type of format the data is to be written to.

Control bits for enabling the color space converter, a video output format bit for controlling which output mode of two defined modes will be used (32 bit, 16 bit), and a dithering circuit enable are notably provided. In addition, a separate image size register (Table 25) allows the video output formatter to operate independently of the MPEG core hardware so decoding and formatting can occur simultaneously.

Specific information on how the data formatted by the video output formatter is displayed can be found in copending application Ser. Nos. 08/438,085 and 08/781,452 entitled CONFIGURABLE VIDEO DISPLAY SYSTEM HAVING LIST-BASED CONTROL MECHANISM FOR TIME-DEFERRED INSTRUCTING OF 3D RENDERING ENGINE THAT ALSO RESPONDS TO SUPERVISORY IMMEDIATE COMMANDS, filed May 10, 1995, cited above, and CONFIGURABLE VIDEO DISPLAY SYSTEM HAVING LIST-BASED CONTROL MECHANISM FOR BY-THE-LINE AND BY-THE-PIXEL MODIFICATION OF DISPLAYED FRAMES AND METHOD OF OPERATING SAME filed May 10, 1995, cited above.

Decoding a Single MPEG Stream

Figure 12:
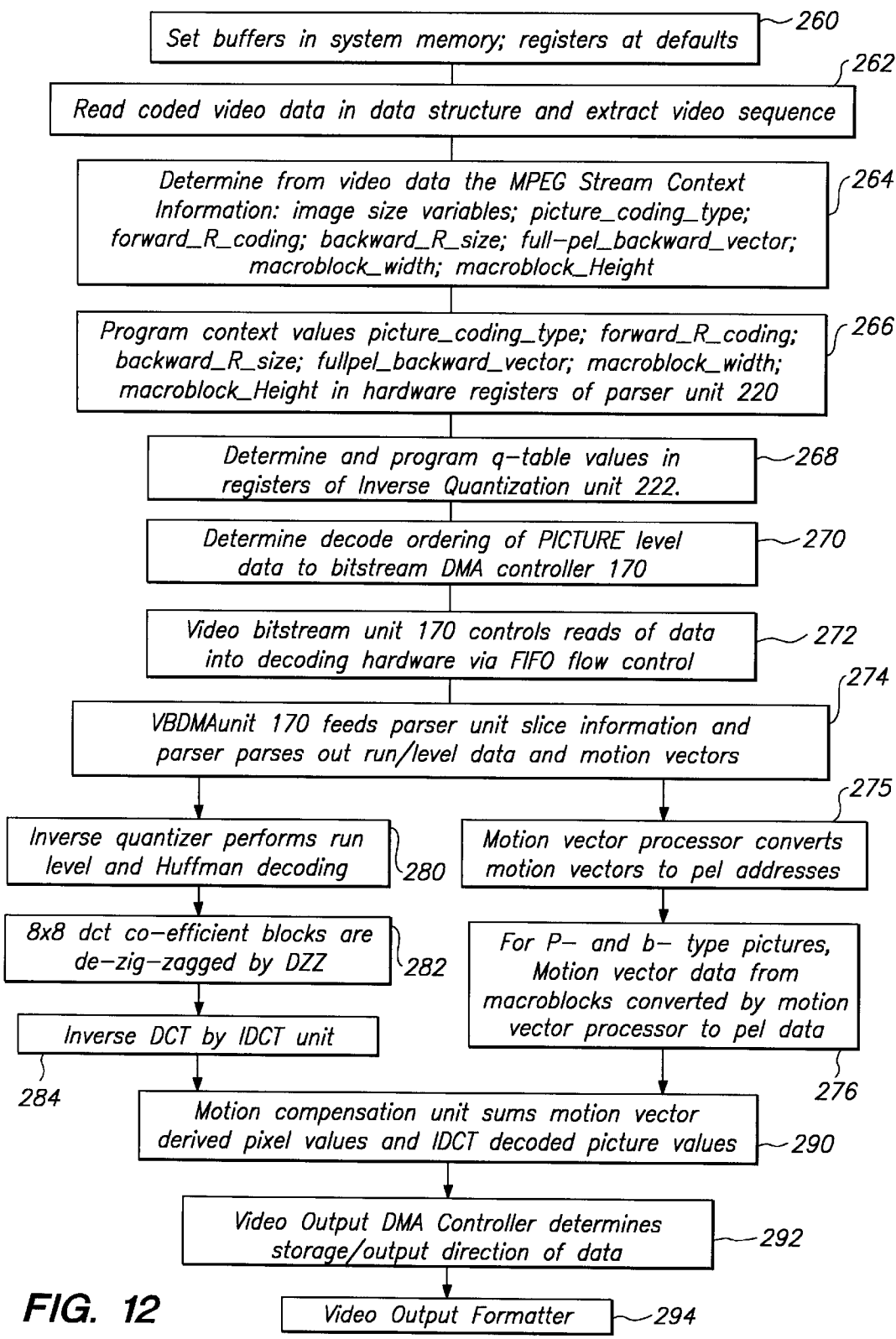
FIG. 12 is a process flow chart of a process for decoding a single MPEG data stream in accordance with the present invention.
Figure 13:
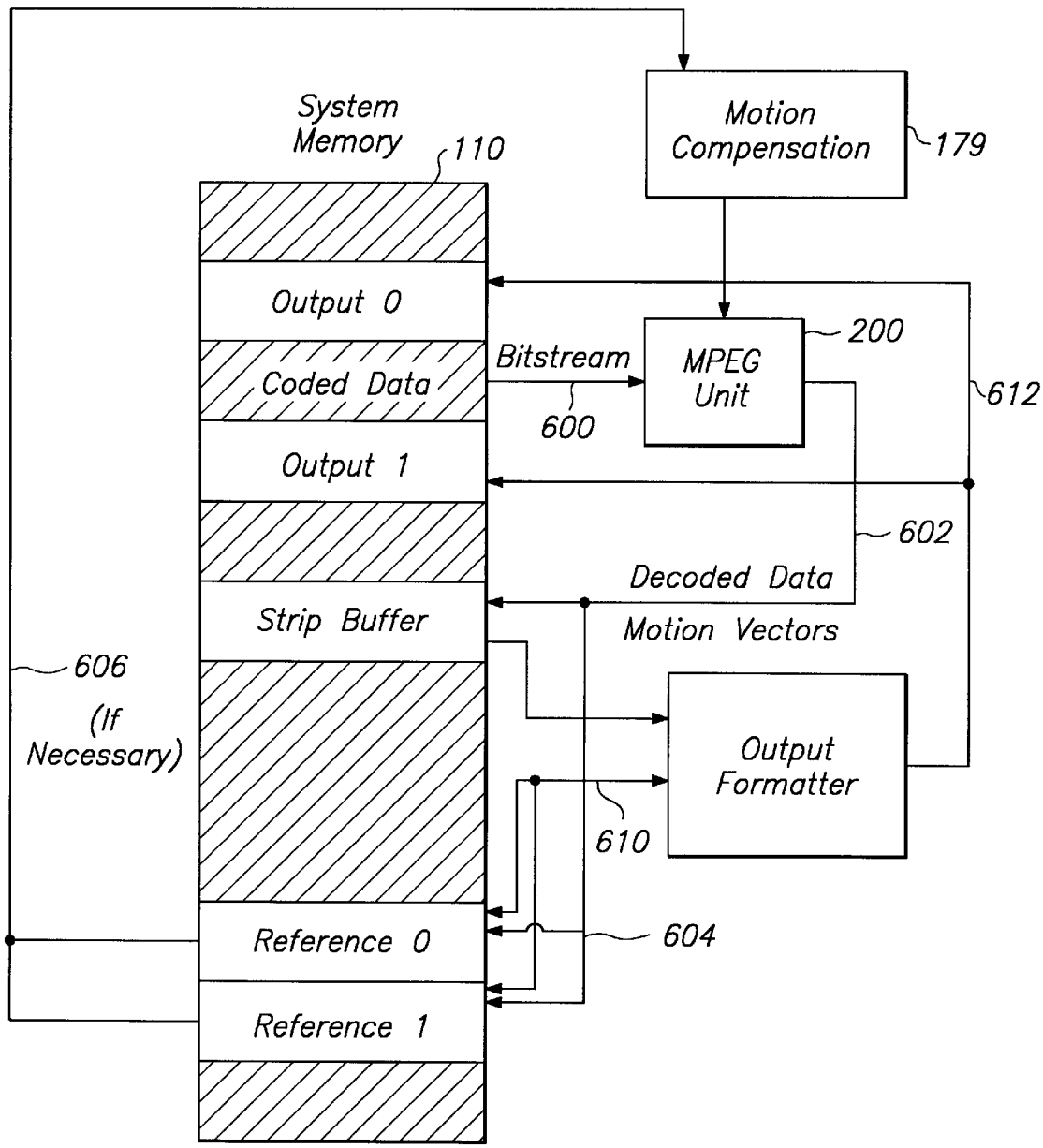
FIG. 13 is a block diagram of the data flow between a host system memory and the MPEG decoding hardware in accordance with the present invention.

FIGS. 12 and 13 disclose the method of decoding an MPEG encoded video stream in accordance with the invention, and the data flow of video stream decompression in decompressing a single MPEG stream.

As shown in FIG. 10, initially, the system instructions program system memory buffers and the configuration register information is set at default. This includes the configuration register bit descriptions to allow the decoder system of the present invention to operate.

At step 262, a read of the compressed video stream from system memory 110 (or another suitable data structure source) occurs to determine, at step 264, context information from the video stream, including image size variables, and information for the parser unit 212 (including picture coding type, the forward R and backward R coding and size, the full pel backward vector, the macroblock width and the macroblock height). At step 266, the context information is programmed into the configuration registers of parser unit 220. At step 268, the Q table values are determined and programmed in the registers of inverse quantization unit 222. At step 270, the decoding of the pictures is determined and the slice information provided to coded data address locations in system memory 110 which are accessible by video bitstream DMA controller 170. The bitstream read addresses are written to the bitstream read address status registers.

Steps 260 through 270 complete the software instruction operations of the system of the present invention with respect to decoding the video bitstream.

The system hardware then completes the video decoding process. At step 272, video bitstream DMA unit 170 controls reads the encoded, macroblock-level data into the FIFO of the video bitstream DMA controller 170 in accordance with the description set forth above. At step 274, parser unit 170 parses the macroblock data into run level pairs for inverse quantization unit 214 and motion vector data for motion vector processor 212. Motion vectors are sent to the motion vector processor 212 at step 276 in FIG. 10. At step 280, the inverse quantizer unit 214 performs run level and Huffman decoding using the quantization tables provided at step 268. At step 282, 8×8 DCT coefficient blocks provided from inverse quantization unit 214 are provided to de-zig-zag unit 216 and DCT coefficients data are provided to IDCT unit 218. At step 284, inverse discrete cosine transform unit 218 performs an inverse discrete cosine transform on the decoded data. At step 290, motion compensation unit sums the motion prediction values and the IDCT decoded picture data by querying, when necessary, prediction reference data resident in the system memory, as will be explained with reference to FIG. 13. The decoded data is provided to the video output DMA control at step 292 and the video output formatter at step 294.

FIG. 13 represents a flow diagram of the data flow from specific locations in system memory 110 during video stream decompression. As should be generally understood by FIG. 13, the system memory is divided into five buffers: a coded data buffer, a strip buffer, two reference buffers (reference 0, reference 1), and two output buffers (output 0, output 1).

Image data flow, represented by arrow 600, comprises encoded data at the bitstream slice level, parsed in accordance with steps 260–270 of FIG. 10, provided to MPEG core unit 200 from system memory 110. Decoded data is returned to system memory 110, and specifically to a strip buffer utilized to hold the information prior to display. Decoded prediction data from motion vector processor (step 275) is also written to reference buffers 0 and 1, as represented along line 604, for use by motion compensation unit 179 relative to decoding P-picture and B-picture macroblocks. The decoded prediction data from reference buffers 0 and 1 will, if necessary, be provided to motion compensation unit 175 as represented by line 606. As shown at line 610, reference buffer data may also be used by the output formatter. The output of the video output formatter is provided to output buffers 1 and 2 as represented by line 612.

System memory 110 may include a series of output buffers, and a series of reference buffers, all which may be utilized in accordance with a one-to-one mapping of streams to reference buffer sets when the decoding hardware is decoding multiple streams of data.

However, a unique feature of the system of the present invention is the use of a single set of strip and reference buffers. The reference buffers may be implemented as a cache buffer system where the newest P- or B-picture reference information from several sequences is written into the section of the code (Reference 0 or 1) containing the oldest previously written P- or B-data. This reduces the system memory bandwidth required to implement the system of the present invention.

Figure 14:
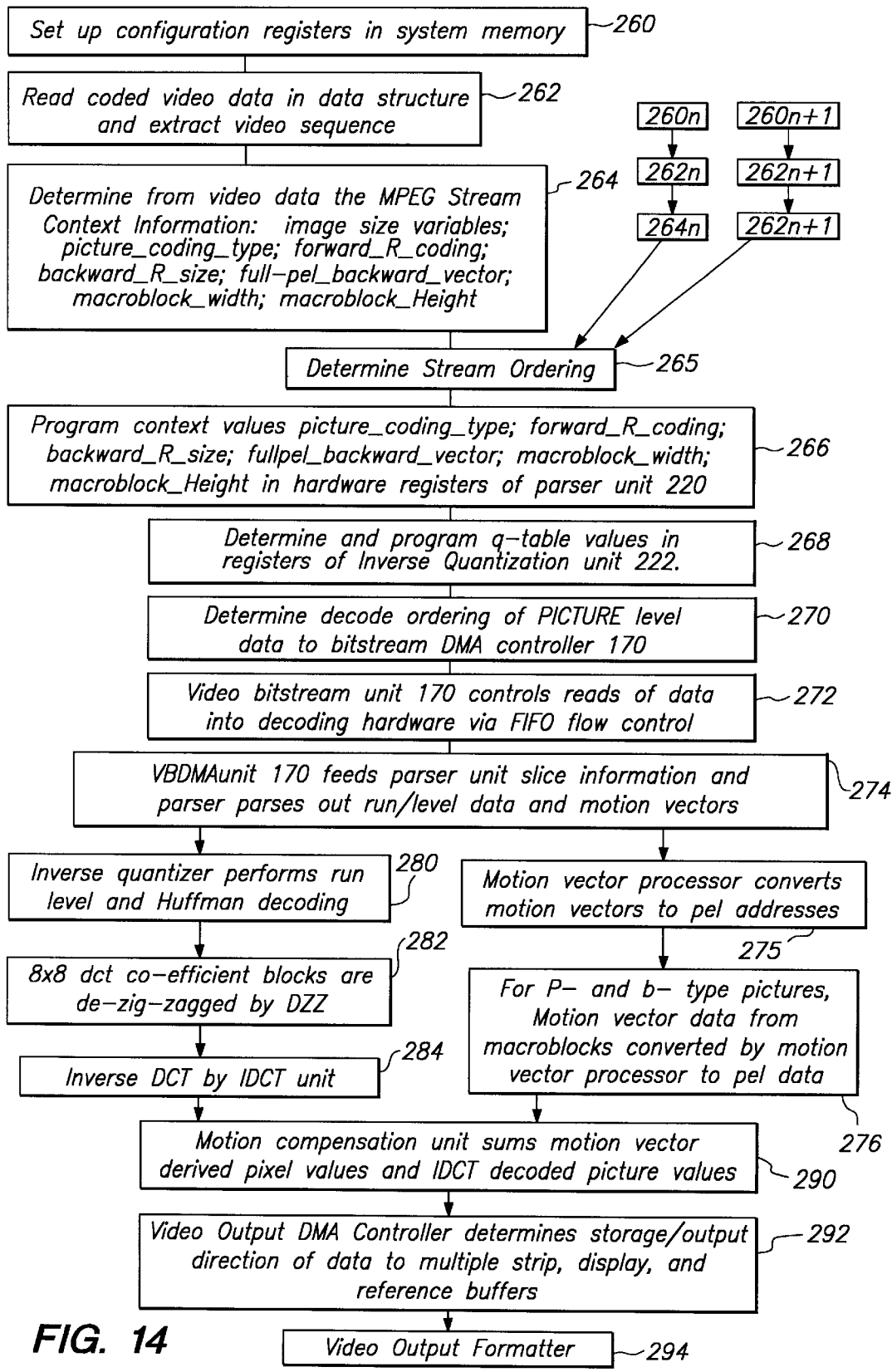
FIG. 14 is a flow chart indicating a multiple decode sequence for the method of decoding MPEG video data in accordance with the present invention.

A software sequence of a multiple threaded decoding algorithm is shown in FIG. 14. In interactive bitstreams, the sequence layer, group of pictures layer, and picture layer may be absent. Because multiple sequence headers, group of pictures headers, and picture reference information is included in the stream, random access into the video sequence is possible and indeed contemplated by the MPEG-1 standard. However, to achieve such random access, the MPEG-1 standard relies on repetition of the sequence header. As shown in FIG. 14, each decoding sequence, at the video stream, group of pictures, picture or slice level, will require execution of steps 260–264. Thus, steps 260–264, 260n–264n, and 260–264n+1 are shown for 3 streams. A decision at step 265 is made by the control software dependent upon the nature of the display information being decoded. For example, if the information to be decoded is multiple small pixel array moving representations of baseball players on a field, decision step 265 would determine the ordering of decoding based upon the actions required of the players during the display. Thus, the specific criteria upon which ordering of streams occurs will be dependent upon the nature of the application being decoded, the information being displayed, the output format, and any number of other factors. Each stream from steps 266–264, 260n–264n, etc. may be selectively fed to the hardware processing steps 277–294. Because of the speed of the decoding hardware 200, an effective multiple-thread decode of image data is possible. In other words, multiple streams of data to be decoded could be provided to the decoding hardware for processing and, due to the speed of the hardware, each stream will be decoded and sent to system memory.

FIG. 15 shows the inputs and outputs of each block of data and the direction of each block of data during a typical video sequence. The diagram assumes the common IBBPBBPBBI type frame ordering. The input frames are shown in coded as opposed to temporal ordering. The rows detail the input and output of each of the hardware blocks as well as the contents of each buffer over time.

The many features and advantages of the present invention will be readily apparent to one of average skill in the art. In accordance with the objectives of the invention, an efficient, configurable, low-cost MPEG decoding system is provided. The decoder utilizes a unique combination of hardware and software functions to decode an MPEG video stream. The system allows decoding of multiple streams of MPEG video data.

What is claimed is:

1. An MPEG decoder in a host computer system, the host computer system including a host processor, a system memory, a system bus, and a system memory controller, comprising:

a memory controller interface coupled to the system memory controller;

a video stream DMA controller, coupled to the memory controller interface;

a parsing means for distributing coded motion vector information blocks and image data information blocks;

an entropy decoding means, coupled to the parsing means, receiving distributed image data blocks and decoding the image data blocks into quantized coefficient blocks;

an inverse quantization means for receiving the quantized coefficient blocks and performing an inverse quantization on said quantized coefficient blocks to form pixel value blocks;

an inverse zig-zag means for converting the pixel value blocks to pixel coefficients;

an inverse discrete cosine transform means for calculating the inverse discrete cosine transform of the pixel coefficients to produce pixel display values;

a motion vector processor means, coupled to the parsing means and receiving the distributed motion vector blocks, for decoding the motion vector blocks into pixel motion vectors;

a motion compensation unit, coupled to the motion vector analyzer and the inverse discrete cosine transform means, for adding the pixel motion vectors and pixel display values;

a video output DMA controller, coupled to the motion compensation unit and the memory controller interface, for ordering the pictures in an output order; and a video output formatter, coupled to the video output DMA controller and the memory controller interface, wherein the system memory includes data buffers, wherein data to be decoded is provided in said buffers identified by a plurality of addresses, and wherein said DMA controller is operatively coupled to said buffers.

2. The decoder of claim 1 wherein the bitstream DMA controller includes a FIFO RAM, a FIFO RAM controller, an end of picture detector, and an address generator for generating said addresses.

3. The decoder of claim 2 wherein the bitstream DMA controller includes an address register queue, said register queue containing system memory addresses for the coded data.

4. The decoder of claim 3 wherein the address register queue includes a current address register, a next address register, a current length register and a next length register.

5. An MPEG decoder in a host computer system, the host computer system including a host processor, a system memory, a system bus, and a system memory controller, comprising:

a memory controller interface coupled to the system memory controller;

a video stream DMA controller, coupled to the memory controller interface;

a parsing means for distributing coded motion vector information blocks and image data information blocks;

an entropy decoding means, coupled to the parsing means, receiving distributed image data blocks and decoding the image data blocks into quantized coefficient blocks;

an inverse quantization means for receiving the quantized coefficient blocks and performing an inverse quantization on said quantized coefficient blocks to form pixel value blocks;

an inverse zig-zag means for converting the pixel value blocks to pixel coefficients;

an inverse discrete cosine transform means for calculating the inverse discrete cosine transform of the pixel coefficients to produce pixel display values;

a motion vector processor means, coupled to the parsing means and receiving the distributed motion vector blocks, for decoding the motion vector blocks into pixel motion vectors;

a motion compensation unit, coupled to the motion vector analyzer and the inverse discrete cosine transform means, for adding the pixel motion vectors and pixel display values;

a video output DMA controller, coupled to the motion compensation unit and the memory controller interface, for ordering the pictures in an output order; and a video output formatter, coupled to the video output DMA controller and the memory controller interface, wherein the parsing means comprises a bit shifter, a state machine and a FIFO RAM.

6. The decoder of claim 5 wherein the parsing means contains programmable registers for receiving context information including image size data and picture coding information.

7. The decoder of claim 6 wherein the image size data includes an macroblock width and macroblock height.

8. The decoder of claim 7 wherein the picture coding information includes the picture coding type, the forward r size, backward r size, the forward pel vector and backward pel vector.

9. The decoder of claim 5 wherein the state machine is coupled to the motion vector processor means, and said FIFO.

10. The decoder of claim 9 wherein an output of said state machine comprises motion vector data provided to the motion vector processing means and another output of said state machine comprises picture data provided to said FIFO.

11. The decoder of claim 9 wherein said system memory includes a configuration register containing configuration information on said parsing means, entropy decoding means, motion compensation unit, video output DMA controller and video output formatter.

12. The decoder of claim 9 wherein said inverse quantization means includes a quantization table register.

13. An MPEG decoder in a host computer system, the host computer system including a host processor, a system memory, a system bus, and a system memory controller, the system memory containing data to be decoded, comprising:

control means for instructing the host processor to deconstruct the encoded image data to extract macroblock level data comprising encoded picture data blocks and motion vector blocks, for instructing the host processor to determine the decoding order of the macroblock data, and for extracting picture data and quantization table data from the encoded image data;

a system memory controller interface coupled to the system memory controller via the system bus;

a video image data DMA controller, coupled to the system memory controller interface, the DMA controller including a video stream buffer receiving picture data from the system memory under direction of the control means;

a motion compensation unit, coupled to the system memory controller interface;

a slice and macroblock decompression unit, coupled to the video stream buffer and the motion compensation unit, the decompression unit comprising:

a configurable parser, coupled to the video stream buffer for directing pixel data blocks and motion vector blocks;

a configurable decoding unit receiving pixel data blocks and performing entropy decoding and inverse quantization on said pixel data blocks;

a pixel data block inverse zig-zag scan unit, receiving pixel data blocks from the configurable decoding unit;

an inverse discrete cosine transform unit receiving pixel data blocks from the inverse zigzag scan unit and performing and outputting pixel data blocks having decoded pixel value data; and a motion vector processor, coupled to the parser, receiving the motion vector blocks;

a motion compensation unit, coupled to the inverse discrete cosine transform unit and the motion vector processor;

a video output DMA controller, coupled to the system memory interface controller and the motion compensation unit; and a video output formatter, coupled to the system memory interface controller and the motion video output DMA controller, wherein said control means includes means for defining, in said system memory, a plurality of buffers including at least configuration buffers, data buffers, and display buffers.

14. The decoder of claim 13 wherein said data buffers include said encoded data blocks.

15. An MPEG decoder in a host computer system, the host computer system including a host processor, a system memory, a system bus, and a system memory controller, comprising:

a memory controller interface coupled to the system memory controller;

a video stream DMA controller, coupled to the memory controller interface;

a parsing means for distributing coded motion vector information blocks and image data information blocks;

an entropy decoding means, coupled to the parsing means, receiving distributed image data blocks and decoding the image data blocks into quantized coefficient blocks;

an inverse quantization means for receiving the quantized coefficient blocks and performing an inverse quantization on said quantized coefficient blocks to form pixel value blocks;

an inverse zig-zag means for converting the pixel value blocks to pixel coefficients;

an inverse discrete cosine transform means for calculating the inverse discrete cosine transform of the pixel coefficients to produce pixel display values;

a motion vector processor means, coupled to the parsing means and receiving the distributed motion vector blocks, for decoding the motion vector blocks into pixel motion vectors;

a motion compensation unit, coupled to the motion vector analyzer and the inverse discrete cosine transform means, for adding the pixel motion vectors and pixel display values;

a video output DMA controller, coupled to the motion compensation unit and the memory controller interface, for ordering the pictures in an output order;

a video output formatter, coupled to the video output DMA controller and the memory controller interface; and hardware configuration registers, said configuration registers including system configuration information for said configurable parser, said configurable decoding unit, said video output DMA controller, and said video output formatter.

16. The decoder of claim 15 wherein said parser includes a parser configuration register for storing context information.

17. The decoder of claim 15 wherein said parser configuration information includes at least the picture coding type, the forward r size, and the backward r size of the data to be decoded.

18. The decoder of claim 13 wherein the buffers include a reference buffer, operatively coupled to the motion compensation unit, storing reference image data.

19. The decoder of claim 18 wherein two reference buffers are provided, and reference picture information is alternatively written to each said buffer.

20. The decoder of claim 13 wherein the registers include a strip buffer register, operatively coupled to the motion compensation unit and the video output DMA controller, storing decoded image data.

21. The decoder of claim 13 wherein the display buffers include display data output from the video output formatter.

22. The decoder of claim 13 wherein the entropy decoding unit includes a register to store quantization table data.

23. The decoder of claim 13 wherein the video image data DMA controller includes an address queue and a length queue, the address and length queues including current and future system memory addresses where coded data is located in system memory.

24. An integrated circuit for decoding coded data in a host system, the host system including a host system memory, a host system processor, a host system memory controller, and a host system bus, the integrated circuit comprising:

a memory controller interface, coupled to the host system memory controller by the host system bus;

a input/output bus, operatively coupled to the host system memory controller and the memory controller interface;

an encoded data DMA controller, coupled to the I/O bus;

a motion compensation unit, coupled to the I/O bus;

a output data DMA controller, coupled to the I/O bus;

an output formatter, coupled to the I/O bus; and data decompression hardware, having a first I/O port operatively coupled to the encoded data DMA controller and a second I/O port coupled to the motion compensation unit, said hardware receiving encoded MPEG video macroblock information at the first I/O port and outputting decoded MPEG video data at the second I/O port, wherein the system memory includes data buffers, wherein data to be decoded is provided in said buffers identified by a plurality of addressees, and wherein said encoded data DMA controller is operatively coupled to said buffers via the memory controller interface.

25. An integrated circuit for decoding coded data in a host system, the host system including a host system memory, a host system processor, a host system memory controller, and a host system bus, the integrated circuit comprising:

a memory controller interface, coupled to the host system memory controller by the host system bus;

a input/output bus, operatively coupled to the host system memory controller and the memory controller interface;

an encoded data DMA controller, coupled to the I/O bus;

a motion compensation unit, coupled to the I/O bus;

a output data DMA controller, coupled to the I/O bus;

an output formatter, coupled to the I/O bus; and data decompression hardware, having a first I/O port operatively coupled to the encoded data DMA controller and a second I/O port coupled to the motion compensation unit, said hardware receiving encoded MPEG video macroblock information at the first I/O port and outputting decoded MPEG video data at the second I/O port, wherein the encoded data DMA controller includes a FIFO RAM, a FIFO RAM controller, an end of picture detector, and an address generator for generating said addresses.

26. The circuit of claim 25 wherein the address generator includes registers containing configuration information regarding the encoded data location in system memory.

27. The circuit of claim 26 wherein the registers include a current address register, a next address register, a current length register and a next length register.

28. An integrated circuit for decoding coded data in a host system, the host system including a host system memory, a host system processor, a host system memory controller, and a host system bus, the integrated circuit comprising:

a memory controller interface, coupled to the host system memory controller by the host system bus;

a input/output bus, operatively coupled to the host system memory controller and the memory controller interface;

an encoded data DMA controller, coupled to the I/O bus;

a motion compensation unit, coupled to the I/O bus;

a output data DMA controller, coupled to the I/O bus;

an output formatter, coupled to the I/O bus;

data decompression hardware, having a first I/O port operatively coupled to the encoded data DMA controller and a second I/O port coupled to the motion compensation unit, said hardware receiving encoded MPEG video macroblock information at the first I/O port and outputting decoded MPEG video data at the second I/O port, wherein the data decompression hardware includes:

a configurable parser, coupled to the system memory, for directing encoded data in pixel data blocks and motion vector blocks;

a configurable decoding unit receiving pixel data blocks and performing entropy decoding and inverse quantization on said pixel data blocks;

a pixel data block inverse zig-zag scan unit, receiving pixel data blocks from the configurable decoding unit;

an inverse discrete cosine transform unit receiving pixel data blocks from the inverse zig-zag scan unit and performing and outputting pixel data blocks having decoded pixel value data; and a motion vector processor, coupled to the parser, receiving the motion vector blocks and generating motion pixel motion data.

29. The circuit of claim 28 wherein the configurable parser includes configuration registers for storing context information on said encoded video data.

30. The circuit of claim 28 wherein the configurable decoding unit includes a register for storing quantization tables.

31. An integrated circuit for decoding coded data in a host system, the host system including a host system memory, a host system processor, a host system memory controller, and a host system bus, the integrated circuit comprising:

a memory controller interface, coupled to the host system memory controller by the host system bus;

a input/output bus, operatively coupled to the host system memory controller and the memory controller interface;

an encoded data DMA controller, coupled to the I/O bus;

a motion compensation unit, coupled to the I/O bus;

a output data DMA controller, coupled to the I/O bus;

an output formatter, coupled to the I/O bus; and data decompression hardware, having a first I/O port operatively coupled to the encoded data DMA controller and a second I/O port coupled to the motion compensation unit, said hardware receiving encoded MPEG video macroblock information at the first I/O port and outputting decoded MPEG video data at the second I/O port, wherein the data decompression hardware further includes:
  a motion compensation unit, coupled to the inverse discrete cosine transform unit and the motion vector processor;
  a video output DMA controller, coupled to the system memory interface controller and the motion compensation unit; and
  a video output formatter, coupled to the system memory interface controller and the motion video output DMA controller.

32. An MPEG decoding system, comprising:
  a host system including a host system memory, a host system memory controller, a host system processor, and a host system bus, the host system memory being divided into at least a storage area buffer, a first and a second display buffer buffers, a coded data buffer, and a first and second reference buffers;
  MPEG video data decoding hardware including:
    means for parsing image data blocks and motion vector blocks from macroblock data;
    means for constructing motion vector data from coded motion vector blocks;
    means for performing entropy decoding on coded image data blocks;
    means for performing inverse quantization of the coded image data blocks;
    means for taking the inverse discrete cosine transform of the coded image data;
    a motion compensation means, coupled to the means for taking the inverse discrete cosine transform and the motion vector processor, and operatively coupled to the system memory, for constructing picture data from the image data and motion vector blocks;
    a video output DMA controller, operatively coupled to the system memory controller and the motion compensation means;
    a video output formatter, coupled to the system memory and the video output DMA controller; and
  instruction means, provided in the storage area and executable by the host system processor, for directing encoded image data to the parsing means in a decoding order, for configuring the means for parsing image data blocks, and interacting with the host system memory to store decoded image data, display image data, and configuration data for the decoding hardware,
  wherein said instruction means includes means for defining, in said system memory, a plurality of buffers including at least data buffers, reference buffers, and display buffers.

33. The decoder of claim 32 wherein said data buffers include said encoded data blocks.

34. An MPEG decoding system, comprising:
  a host system including a host system memory, a host system memory controller, a host system processor, and a host system bus, the host system memory being divided into at least a storage area buffer, a first and a second display buffer buffers, a coded data buffer, and a first and second reference buffers;
  MPEG video data decoding hardware including:
    means for parsing image data blocks and motion vector blocks from macroblock data;
    means for constructing motion vector data from coded motion vector blocks;
    means for performing entropy decoding on coded image data blocks;
    means for performing inverse quantization of the coded image data blocks;
    means for taking the inverse discrete cosine transform of the coded image data;
    a motion compensation means, coupled to the means for taking the inverse discrete cosine transform and the motion vector processor, and operatively coupled to the system memory, for constructing picture data from the image data and motion vector blocks;
    a video output DMA controller, operatively coupled to the system memory controller and the motion compensation means;
    a video output formatter, coupled to the system memory and the video output DMA controller; and
  instruction means, provided in the storage area and executable by the host system processor, for directing encoded image data to the parsing means in a decoding order, for configuring the means for parsing image data blocks, and interacting with the host system memory to store decoded image data, display image data, and configuration data for the decoding hardware,
  system configuration registers wherein said configuration registers include configuration information for said configurable parser, said configurable decoding unit, said video output DMA controller and Video Output Formatter.

35. The decoder of claim 34 wherein said parser includes a configuration data register including at least the picture coding type, the forward r size, and the backward r size of the data to be decoded.

36. The decoder of claim 32 wherein the plurality of buffers further includes a strip buffer register, operatively coupled to the motion compensation unit and the video output DMA controller, storing decoded image data.

* * * * *